US009210701B2

(12) United States Patent
Yang et al.

(10) Patent No.: US 9,210,701 B2
(45) Date of Patent: *Dec. 8, 2015

(54) METHOD AND APPARATUS FOR ALLOCATION OF DISCONTINUOUS UPLINK RESOURCE

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 89 days.

This patent is subject to a terminal disclaimer.

(21) Appl. No.: 14/071,319

(22) Filed: Nov. 4, 2013

(65) Prior Publication Data
US 2014/0056268 A1 Feb. 27, 2014

Related U.S. Application Data

(63) Continuation of application No. 13/577,623, filed as application No. PCT/KR2011/003792 on May 24, 2011, now Pat. No. 8,611,299.

(60) Provisional application No. 61/347,794, filed on May 24, 2010.

(51) Int. Cl.
H04W 72/04 (2009.01)
H04L 5/00 (2006.01)
(Continued)

(52) U.S. Cl.
CPC ........... *H04W 72/042* (2013.01); *H04L 5/0007* (2013.01); *H04L 5/0037* (2013.01);
(Continued)

(58) Field of Classification Search
None
See application file for complete search history.

(56) References Cited

U.S. PATENT DOCUMENTS 8,422,393 B2 4/2013 Roh et al.
8,611,299 B2 * 12/2013 Yang et al. ............... 370/329
(Continued)

FOREIGN PATENT DOCUMENTS

EP 2618505 A2 7/2013
JP 2010-514330 A 4/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 9)," 3 GPP TS 36.213 V9.1.0, Mar. 2010, pp. 1-83, XP050401971.
(Continued)

*Primary Examiner* — Andrew Chriss
*Assistant Examiner* — Joshua A Kading
(74) *Attorney, Agent, or Firm* — Birch, Stewart, Kolasch & Birch, LLP

(57) ABSTRACT

The present invention relates to a wireless communication system. More particularly, the present invention relates to a method and apparatus for transmitting an uplink signal in a wireless communication system, wherein the method for transmitting an uplink signal in a wireless communication system comprises: a step of receiving a control channel signal containing resource allocation information; and a step of transmitting an uplink signal in accordance with the control channel signal, wherein the resource allocation information has a combination index r to be used for indicating two sets of resource blocks, and each set of resource blocks includes one or more continuous resource blocks.

16 Claims, 20 Drawing Sheets

(51) Int. Cl.
*H04L 27/26* (2006.01)
*H04J 11/00* (2006.01)
*H04W 92/12* (2009.01)

(52) U.S. Cl.
CPC ............ *H04L5/0041* (2013.01); *H04L 5/0044* (2013.01); *H04L 5/0053* (2013.01); *H04L 5/0091* (2013.01); *H04L 5/0094* (2013.01); *H04L 27/2636* (2013.01); *H04W 72/044* (2013.01); *H04W 72/0413* (2013.01); *H04J 11/003* (2013.01); *H04W 92/12* (2013.01)

(56) References Cited

U.S. PATENT DOCUMENTS

| | | |
|---|---|---|
| 2008/0310483 A1 | 12/2008 | Lee et al. |
| 2009/0175233 A1 | 7/2009 | Ojala et al. |
| 2010/0329220 A1 | 12/2010 | Kim et al. |
| 2011/0085513 A1 | 4/2011 | Chen et al. |
| 2011/0171985 A1 | 7/2011 | Papasakellariou et al. |
| 2014/0036840 A1* | 2/2014 | Yang et al. ............ 370/329 |
| 2014/0056268 A1 | 2/2014 | Yang et al. |
| 2014/0198756 A1* | 7/2014 | Yang et al. ............ 370/329 |

FOREIGN PATENT DOCUMENTS

| | | |
|---|---|---|
| JP | 2010-526499 A | 7/2010 |
| KR | 10-2008-0085657 A | 9/2008 |
| KR | 10-2009-0015350 A | 2/2009 |
| KR | 10-2009-0099500 A | 9/2009 |
| WO | WO 2008/137786 A1 | 11/2008 |
| WO | WO 2009/120827 A1 | 10/2009 |

OTHER PUBLICATIONS

Motorola, "Resource allocation schemes for non-contiguous PUSCH," 3GPP TSG RAN1#61, May 10-14, 2010, 3 pages, R1-103158.
ZTE, "Uplink Non-contiguous Resource Allocation for LTE-Advanced," 3GPP TSG RAN WG1 Meeting #60, Feb. 22-26, 2010, 7 pages, R1-100965.
3GPP TS 36.213 V10.0.0, 3rd Generation Partnership Project; Tech. Spc. Group Radio Access Network; E-UTRA; Physical layer procedures (Release 10), Dec. 2010.
3GPP TS 36.213 V8.6.0, 3rd Generation Partnership Project; Tech. Spc. Group Radio Access Network; E-UTRA; Physical layer procedures (Release 8), Mar. 2009.
ASUSTeK, "Non-contiguous uplink resource allocation for LTE-A," 3GPP TSG-RAN WG1 #57bis, Agenda Item 15.4, R1-092730, Jun. 29-Jul. 3, 2009, Los Angeles, California, 3 pages.
Motorola, "Non-contiguous PUSCH resource allocation," 3GPP TSG-RAN1 #60bis, Agenda Item 6.2.6, R1-102116, Apr. 12-16, 2010, Beijing, China, 3 pages.
Pantech, "On the non-contiguous UL resource allocation," 3GPP TSG-AN WG1 #60, Agenda Item 7.1.6, R1-100989, Feb. 22-26, 2010, San Francisco, California, 6 pages.
Pfaffenberger, Bryan. Webster's New World Computer Dictionary, Ninth Edition. New York: Hungry Minds, Inc., 2001, Print.
ZTE, "Uplink Non-contiguous Resource Allocation for LTE-Advanced," 3GPP TSG-RAN WG1 Meeting #58, Agenda Item 15.4, R1-093205, Aug. 24-28, 2009, Shenzhen, China, 6 pages.

* cited by examiner

Localized DFT-s-OFDMA

Clustered DFT-s-OFDMA

FIG. 15

| RBG index (A total of RA RBGs = 9) (10 is virtual RBG) | $s_0$ comb(10-$s_0$, 4-0) | $s_1$ comb(10-$s_1$, 4-1) | $s_2$ comb(10-$s_2$, 4-2) | $s_3$ comb(10-$s_3$, 4-3) |
|---|---|---|---|---|
| 1 | 126 | 84 | 36 | 9 |
| 2 | (70) | 56 | 28 | 8 |
| 3 | 35 | (35) | 21 | 7 |
| 4 | 15 | 20 | 15 | 6 |
| 5 | 5 | 10 | (10) | 5 |
| 6 | 1 | 4 | 6 | 4 |
| 7 | 0 | 1 | 3 | 3 |
| 8 | 0 | 0 | 1 | (2) |
| 9 | 0 | 0 | 0 | 1 |
| 10 | 0 | 0 | 0 | 0 |

▨ Non-available region

Ex) in case of $s_0 = 2$, $s_1 = 3$, $s_2 = 5$, and $s_4 = 8$ ($r = 70 + 35 + 10 + 2 = 117$)
At this time, RBG #2 (one RBG) is allocated for the first cluster, and RBG #5 to #7 (three RBGs) are allocated for the second cluster.

METHOD AND APPARATUS FOR ALLOCATION OF DISCONTINUOUS UPLINK RESOURCE

CROSS-REFERENCE TO RELATED APPLICATIONS

This application is a Continuation of co-pending application Ser. No. 13/577,623 filed on Aug. 7, 2012, which is the national phase of PCT International Application No. PCT/KR2011/003792 filed on May 24, 2011, and which claims priority to U.S. Provisional Application No. 61/347,794 filed May 24, 2010. The entire contents of all of the above applications are hereby incorporated by reference. The present application relates to U.S. patent application Ser. No. 14/051,280, which is a Continuation of U.S. patent application Ser. No. 13/577,623.

TECHNICAL FIELD

The present invention relates to a wireless communication system, and more particularly, to a method for discontinuous uplink resource allocation and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently allocating resources in a wireless communication system and an apparatus for the same.

Another object of the present invention is to provide a method for discontinuous resource allocation for uplink signal transmission and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for transmitting an uplink signal in a wireless communication system comprises the steps of receiving a control channel signal including resource allocation information; and transmitting the uplink signal in accordance with the control channel signal, wherein the resource allocation information includes a combinatorial index r used to indicate two resource block sets, each of which includes one or more continuous resource block groups (RBGs), and the combinatorial index r is given by the following Equation:

$$r = \sum_{i=0}^{M'-1} \binom{N-s_i}{M'-i},$$

$$\binom{x}{y} = \begin{cases} \binom{x}{y} & \text{if } x \geq y \\ 0 & \text{if } x < y \end{cases}$$

where, M' is 4,
N is the number of RBGs+1,
$s_0$ and $s_1$ correspond to a starting RBG index and an ending RBG index of the first resource block set,
$s_2$ and $s_3$ correspond to a starting RBG index and an ending index of the second resource block set, $$\binom{x}{y}$$

represents $$\frac{x(x-1)\ldots(x-y+1)}{y(y-1)\ldots 1}.$$

In another aspect of the present invention, a communication apparatus used in a wireless communication system comprises a radio frequency (RF) unit; and a processor, wherein the processor is configured to receive a control channel signal including resource allocation information and transmit the uplink signal in accordance with the control channel signal, and the resource allocation information includes a combinatorial index r used to indicate two resource block sets, each of which includes one or more continuous resource block groups (RBGs), the combinatorial index r being given by the following Equation:

$$r = \sum_{i=0}^{M'-1} \binom{N-s_i}{M'-i},$$

$$\binom{x}{y} = \begin{cases} \binom{x}{y} & \text{if } x \geq y \\ 0 & \text{if } x < y \end{cases}$$

where, M' is 4,
N is the number of RBGs+1,
$s_0$ and $s_1$ correspond to a starting RBG index and an ending RBG index of the first resource block set,
$s_2$ and $s_3$ correspond to a starting RBG index and an ending index of the second resource block set, $$\binom{x}{y}$$

represents $$\frac{x(x-1)\ldots(x-y+1)}{y(y-1)\ldots 1}.$$

Preferably, the starting RBG index and the ending RBG index of the first resource block set are $s_0$ and $s_1-1$, respectively, and the starting RBG index and the ending RBG index of the second resource block set are $s_2$ and $s_3-1$, respectively.

Preferably, $\{S_i\}_{i=0}^{M'-1}$ satisfies $1 \leq s_i \leq N$ and $S_i < S_{i+1}$.

Preferably, the N is given by the following Equation:

$$\lceil N_{RB}^{UL}/P \rceil + 1 \qquad \text{Equation}$$

where, $N_{RB}^{UL}$ represents the number of resource blocks of an uplink band, P represents the number of resource blocks constituting an RBG, and $\lceil \ \rceil$ represents a ceiling function.

Preferably, the control channel signal is a physical downlink control channel (PDCCH) signal, and the uplink signal is a physical uplink shared channel (PUSCH) signal.

In still another aspect of the present invention, a method for transmitting an uplink signal in a wireless communication system comprises the steps of receiving a control channel signal including resource allocation information; and transmitting the uplink signal in accordance with the control channel signal, wherein the resource allocation information includes a combinatorial index corresponding to two or more resource index pairs selected from a plurality of resource indexes, and each of the resource index pairs corresponds to a starting resource index and an ending resource index of resource sets continuously allocated.

In further still another aspect of the present invention, a communication apparatus used in a wireless communication system comprises a radio frequency (RF) unit; and a processor, wherein the processor is configured to receive a control channel signal including resource allocation information and transmit the uplink signal in accordance with the control channel signal, and the resource allocation information includes a combinatorial index corresponding to two or more resource index pairs selected from a plurality of resource indexes, and each of the resource index pairs corresponds to a starting resource index and an ending resource index of resource sets continuously allocated.

Preferably, each of the resource index pairs includes a first resource index and a second resource index, the first resource index representing the starting resource index, and the second resource index representing the ending resource index +1.

Preferably, the plurality of resource indexes include one virtual resource index.

Preferably, the last resource index of the plurality of resource indexes is a virtual resource index.

Preferably, the control channel signal is a physical downlink control channel (PDCCH) signal, and the uplink signal is a physical uplink shared channel (PUSCH) signal.

Advantageous Effects

According to the present invention, resources can be allocated efficiently in a wireless communication system. Specifically, discontinuous resource allocation for uplink transmission can be performed efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 14 and FIG. 15 are diagrams illustrating uplink transmission according to the embodiment of the present invention.

BEST MODE FOR CARRYING OUT THE INVENTION

Hereinafter, structures, operations, and other features of the present invention will be understood readily by the preferred embodiments of the present invention, examples of which are illustrated in the accompanying drawings. The embodiments of the present invention may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

The following embodiments will be described based on that technical features of the present invention are applied to the 3GPP LTE/LTE-A. However, it is to be understood that the 3GPP system is only exemplary and the technical spirits of the present invention are not limited to the 3GPP LTE/LTE-A. Also, specific terminologies used hereinafter are provided to assist understanding of the present invention, and various modifications may be made in the specific terminologies within the range that does not depart from the technical spirits of the present invention.

Figure 1:
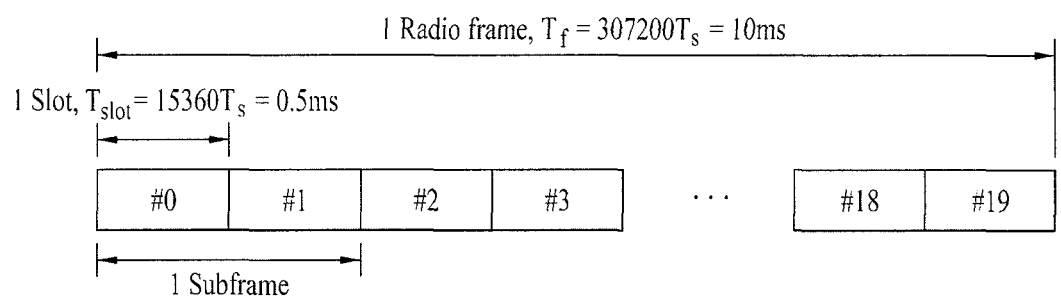
FIG. 1 is a diagram illustrating a structure of a radio frame in a 3GPP system.

FIG. 1 is a diagram illustrating a structure of a radio frame.

Referring to FIG. 1, the radio frame includes ten (10) subframes, each of which includes two slots in a time domain. The time required to transmit the subframes will be referred to as a transmission time interval (TTI). For example, one subframe has a length of 1 ms, and one slot has a length of 0.5 ms. The slot includes a plurality of OFDM symbols or SC-FDMA symbols in a time region. Since the 3GPP LTE uses OFDMA in a downlink and uses SC-FDMA in an uplink, OFDM or SC-FDMA symbols represent one symbol interval. A resource block (RB) is a resource allocation unit, and includes a plurality of continuous subcarriers in one slot. The aforementioned structure of the radio frame is only exemplary, and various modifications may be made in the number of subframes included in the radio frame, the number of slots included in the subframe, or the number of symbols included in the slot.

Figure 2:
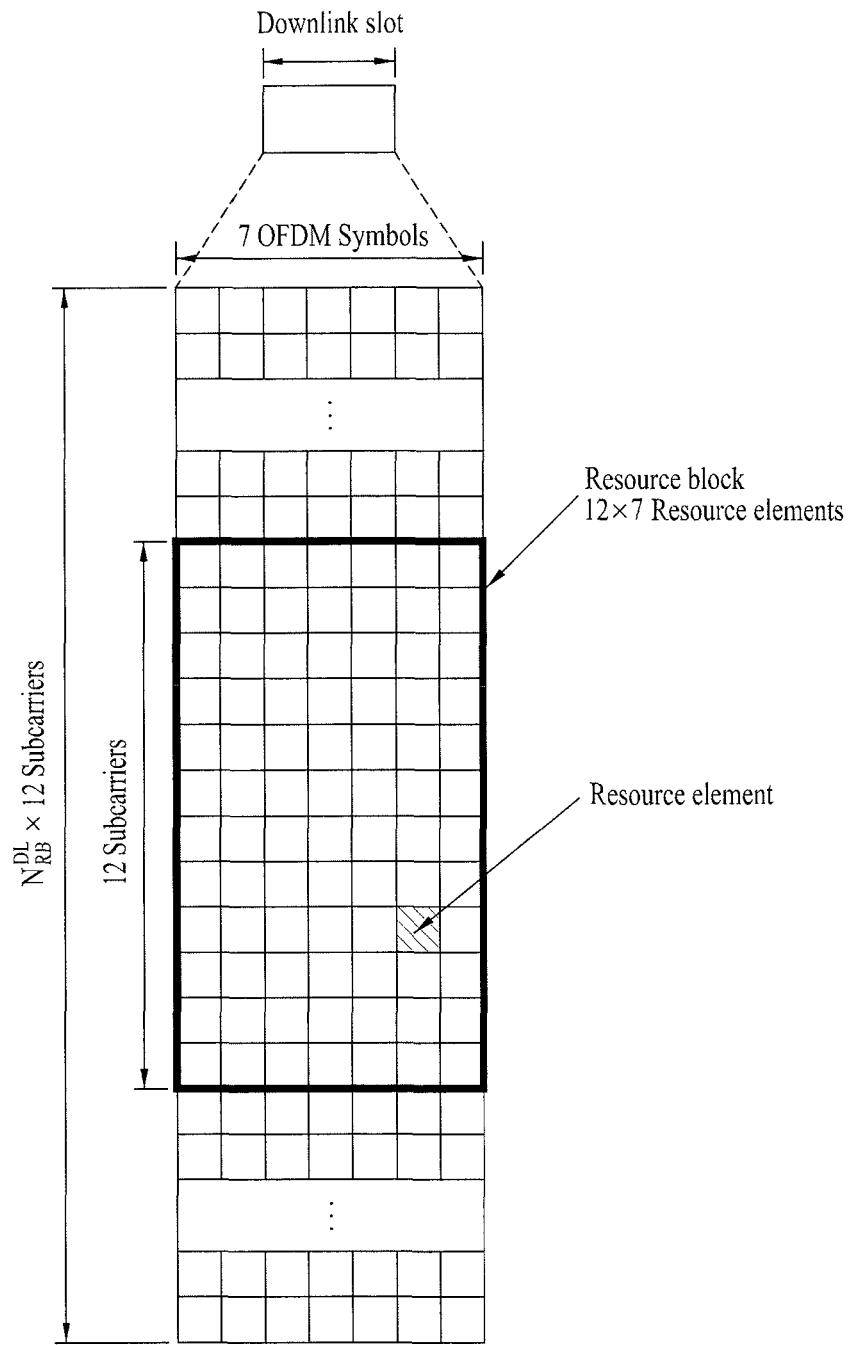
FIG. 2 is a diagram illustrating a resource grid of a downlink slot.

FIG. 2 is a diagram illustrating a resource grid of a downlink slot.

Referring to FIG. 2, the downlink slot includes a plurality of OFDM symbols in a time region. One downlink slot includes seven (six) OFDM symbols, and a resource block includes twelve subcarriers in a frequency domain. Each element on the resource grid will be referred to as a resource element (RE). One resource block (RB) includes 12×7(6) resource elements. The number $N_{RB}^{DL}$ of resource blocks (RBs) included in the downlink slot depends on a downlink transmission bandwidth. A structure of uplink slot is the same as that of the downlink slot except that OFDM symbols are replaced with SC-FDMA symbols and $N_{RB}^{DL}$ is replaced with $N_{RB}^{UL}$.

Figure 3:
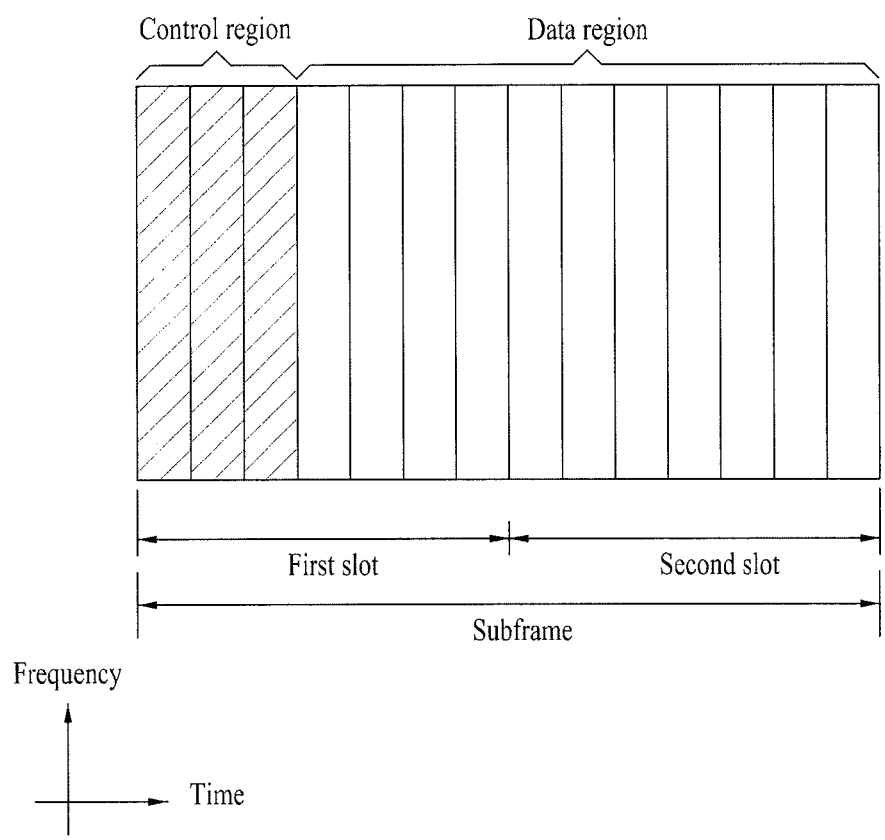
FIG. 3 is a diagram illustrating a structure of a downlink subframe.

FIG. 3 is a diagram illustrating a structure of a downlink subframe.

Referring to FIG. 3, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of the downlink control channel used in the 3GPP LTE include PCFICH (Physical Control Format Indicator CHannel), PDCCH (Physical Downlink Control CHannel), and PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) in response to uplink transmission.

The control information transmitted through the PDCCH will be referred to as a downlink control information (DCI). The DCI includes resource allocation information for a user equipment or user equipment group and other control information. For example, the DCI includes uplink/downlink scheduling information, uplink transmission (Tx) power control command, etc.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a user equipment group, a transmission power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). The format of the PDCCH and the number of bits of the PDCCH are determined depending on the number of CCEs. A base station determines a PDCCH format depending on the DCI to be transmitted to the user equipment, and attaches cyclic redundancy check (CRC) to the control information. The CRC is masked (or scrambled) with an identifier (for example, radio network temporary identifier (RNTI)) depending on usage of the PDCCH or user of the PDCCH. If the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. If the PDCCH is for system information (in more detail, system information block (SIB)), system information RNTI (SI-RNTI) may be masked with the CRC. If the PDCCH is for a random access response, a random access RNTI (RA-RNTI) may be masked with the CRC. For example, CRC masking (or scrambling) includes XOR operation of CRC and RNTI at a bit level.

Figure 4:
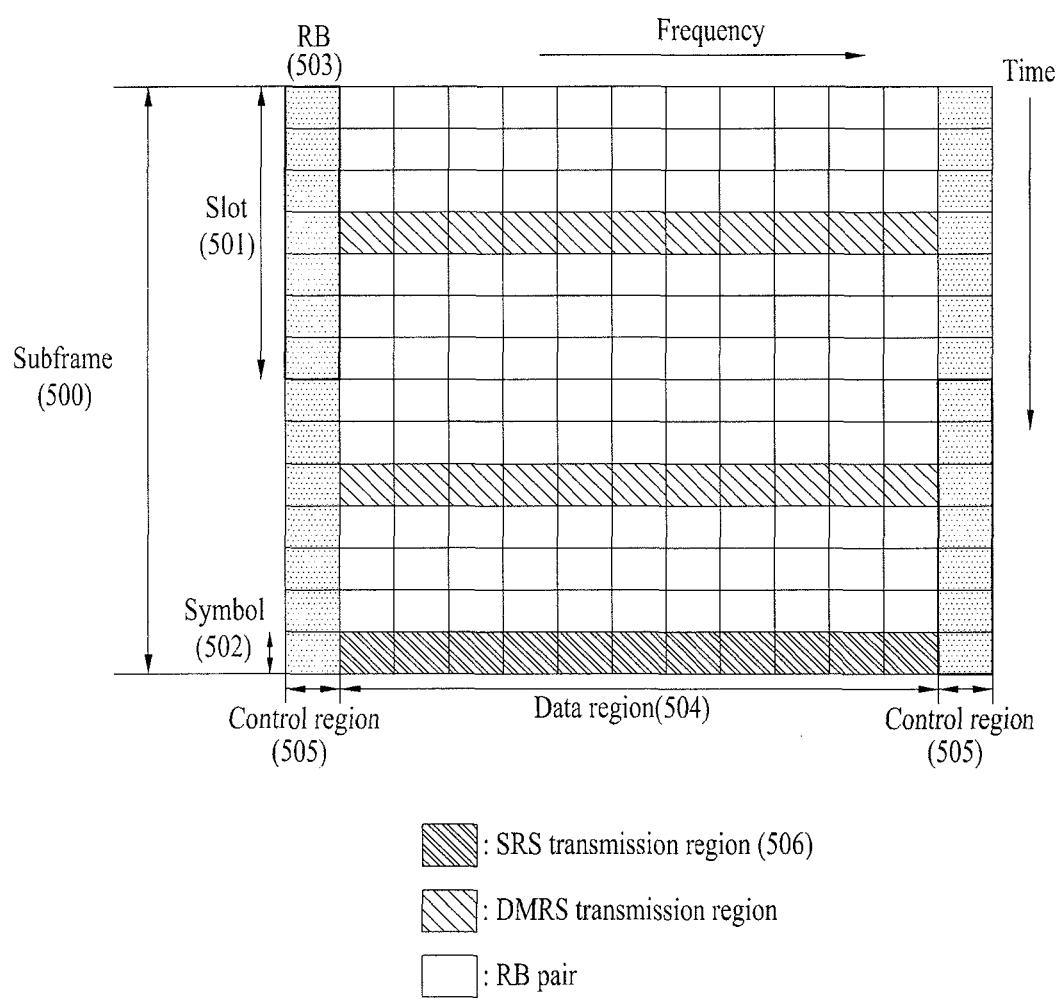
FIG. 4 is a diagram illustrating a structure of an uplink subframe.

FIG. 4 is a diagram illustrating a structure of an uplink subframe.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. For example, in case of normal CP, the slot may include SC-FDMA symbols. The uplink subframe is divided into a data region and a control region in a frequency domain. The data region includes a PUSCH, and is used to transmit a data signal such as voice. The control region includes a PUCCH, and is used to transmit control information. The PUCCH includes RB pair (for example, m=0, 1, 2, 3) located at both ends of the data region on a frequency axis, and performs hopping on the border of the slots. The control information includes HARQ ACKNACK, channel quality information (CQI), a precoding matrix indicator (PMI), rank indication (RI), etc.

Hereinafter, resource block mapping will be described. Physical resource blocks (PRBs) and virtual resource blocks (VRBs) are defined. The physical resource blocks are as illustrated in FIG. 2. In other words, the physical resource blocks are defined by $N_{symb}^{DL}$ continuous OFDM symbols and in a time domain and $N_{sc}^{RB}$ continuous subcarriers in a time domain. The physical resource blocks are given by numbers $0\sim N_{RB}^{DL}-1$ in the frequency domain. The relation between the physical resource block number $n_{PRB}$ and resource elements (k,l) of the slot is expressed by the following Equation 1.

$$n_{PRB} = \left\lfloor \frac{k}{N_{sc}^{RB}} \right\rfloor \quad \text{[Equation 1]}$$

In this case, k is a subcarrier index, and $N_{sc}^{RB}$ represents the number of subcarriers included in one resource block.

The virtual resource blocks have the same size as that of the physical resource blocks. Localized type virtual resource blocks (LVRB) and distributed type virtual resource blocks (DVRB) are defined. A pair of resource blocks are allocated to two slots of the subframe by a single virtual resource block number $n_{VRB}$ regardless of the type of the virtual resource block.

Figure 5:
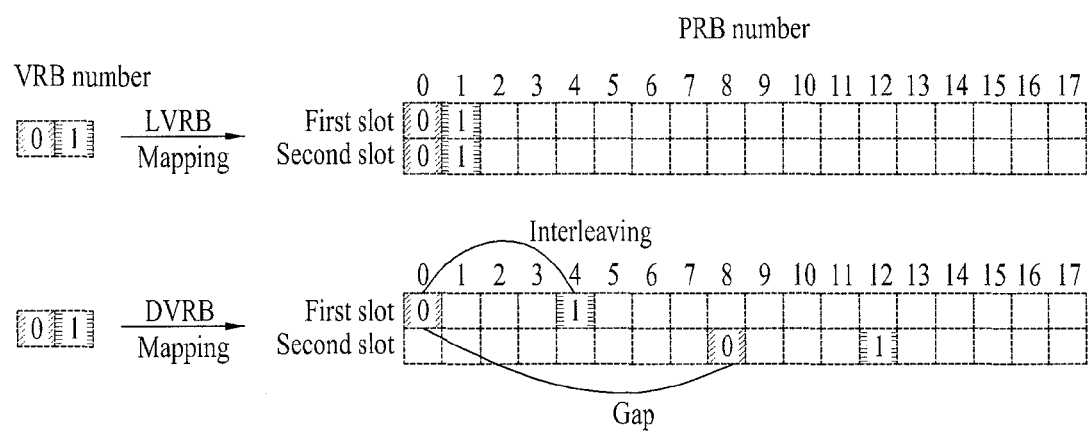
FIG. 5 is a diagram illustrating mapping of a virtual resource block (VRB) into a physical resource block (PRB)

FIG. 5 is a diagram illustrating mapping of a virtual resource block (VRB) into a physical resource block (PRB).

Referring to FIG. 5, since the LVRB is directly mapped into the PRB, a virtual resource block number $n_{VRB}$ corresponds to the physical resource block number $n_{PRB}$ ($n_{PRB}=n_{VRB}$) The VRBs are given by numbers $0\sim N_{VRB}^{DL}-1$, and $N_{VRB}^{DL}=N_{RB}^{DL}$. On the other hand, the DVRB is mapped into the PRB through interleaving. In more detail, the DVRB may be mapped into the PRB as expressed by Table 1 below. Table 1 illustrates RB gap values.

TABLE 1

| System BW ($N_{RB}^{DL}$) | Gap ($N_{gap}$) | |
|---|---|---|
| | 1st gap ($N_{gap,1}$) | 2nd gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |

TABLE 1-continued

| System BW ($N_{RB}^{DL}$) | Gap ($N_{gap}$) | |
|---|---|---|
| | 1st gap ($N_{gap,1}$) | 2nd gap ($N_{gap,2}$) |
| 27-44 | 18 | N/A |
| 45-49 | 27 | N/A |
| 50-63 | 27 | 9 |
| 64-79 | 32 | 16 |
| 80-110 | 48 | 16 |

In Table 1, $N_{gap}$ represents a frequency interval (for example, PRB unit) when the VRBs of the same number are mapped into the PRBs of the first slot and the second slot. In case of $6 \leq N_{RB}^{DL} \leq 49$, only one gap value is defined ($N_{gap}=N_{gap,1}$). In case of $50 \leq N_{RB}^{DL} \leq 110$, two gap values ($N_{gap,1}$ and $N_{gap,2}$) are defined. $N_{gap}=N_{gap,1}$ or $N_{gap}=N_{gap,2}$ is signaled through downlink scheduling. The DVRBs are given by numbers are $0\sim N_{VRB}^{DL}-1$, are $N_{VRB}^{DL}=N_{VRB,gap1}^{DL}=2\cdot\min(N_{gap}, N_{RB}^{DL}-N_{gap})$ for $N_{gap}=N_{gap,1}$ and $N_{VRB}^{DL}=N_{VRB,gap2}^{DL}=\lfloor N_{RB}^{DL}/2N_{gap} \rfloor \cdot 2N_{gap}$ for $N_{gap}=N_{gap,2}$. Also, min(A,B) represents the smaller value of A and B.

The continuous $\tilde{N}_{VRB}^{DL}$ VRB numbers constitute a unit for VRB number interleaving. In case of $N_{gap}=N_{gap,1}$, $\tilde{N}_{VRB}^{DL}=N_{VRB}^{DL}$, and in case of $N_{gap}=N_{gap,2}$, $\tilde{N}_{VRB}^{DL}=2N_{gap}$. VRB number interleaving of each interleaving unit may be performed using four columns and $N_{row}$ rows. $N_{row}=\lceil \tilde{N}_{VRB}^{DL}/(4P) \rceil \cdot P$ is obtained, wherein P represents a size of a resource block group (RBG). The RBG is defined by P continuous resource blocks. The VRB numbers are written in a matrix in a row-by-row format, and read out in a column-by-column format. $N_{null}$ nulls are inserted into the last $N_{null}/2$ rows of the second and fourth columns, and $N_{null}=4N_{row}-\tilde{N}_{VRB}^{DL}$. The null values are disregarded during reading.

Hereinafter, a resource allocation scheme defined in the existing LTE will be described. In the LTE, frequency resource allocation may be indicated per subframe through the PDCCH. The physical RB (PRB) of the first half (i.e., the first slot) of the subframe is paired with that of the second half (i.e., the second slot) of the subframe during resource allocation, wherein the PRBs have the same frequency. In this specification, in view of the first half of the subframe, the resource allocation scheme will be described. In the existing LTE, various methods are used for resource allocation as illustrated in Table 2 and Table 3. Table 2 illustrates a downlink (DL) resource allocation method, and Table 3 illustrates an uplink (UL) resource allocation method.

TABLE 2

| DL RA Method | Description | The number of required bits |
|---|---|---|
| Type 0: bitmap | Bitmap indicates RBG. RBG size depends on a system band. | $\lceil N_{RB}^{DL}/P \rceil$ |
| Type 1: bitmap | Bitmap separately indicates RB within RBG subsets. The number of subsets depends on system band. The number of bits is set equally to the case of the type 0. Accordingly, the same DCI format is used to carry information of type 0 or type 1. | $\lceil N_{RB}^{DL}/P \rceil$ |
| Type 2: continuous allocation | A start location of resource blocks and the number of continuous resource blocks are indicated. | $\lceil \log_2(N_{RB}^{DL}(N_{RB}^{DL}+1)/2) \rceil$ |

TABLE 3

| UL RA Method | Description | The number of required bits |
|---|---|---|
| Continuous allocation | A start location of resource blocks and the number of continuous resource blocks are indicated. | $\lceil \log_2(N_{RB}^{UL}(N_{RB}^{UL}+1)/2) \rceil$ |

In this case, $N_{RB}^{DL}$ represents a downlink bandwidth expressed by a multiple of $N_{sc}^{RB}$. In other words, $N_{RB}^{DL}$ represents a downlink bandwidth in a unit of RB. Similarly, $N_{RB}^{UL}$ represents an uplink bandwidth expressed by a multiple of $N_{sc}^{RB}$. In other words, $N_{RB}^{UL}$ represents an uplink bandwidth in a unit of RB. P represents the number of RBs constituting RBG.

Figure 6A:
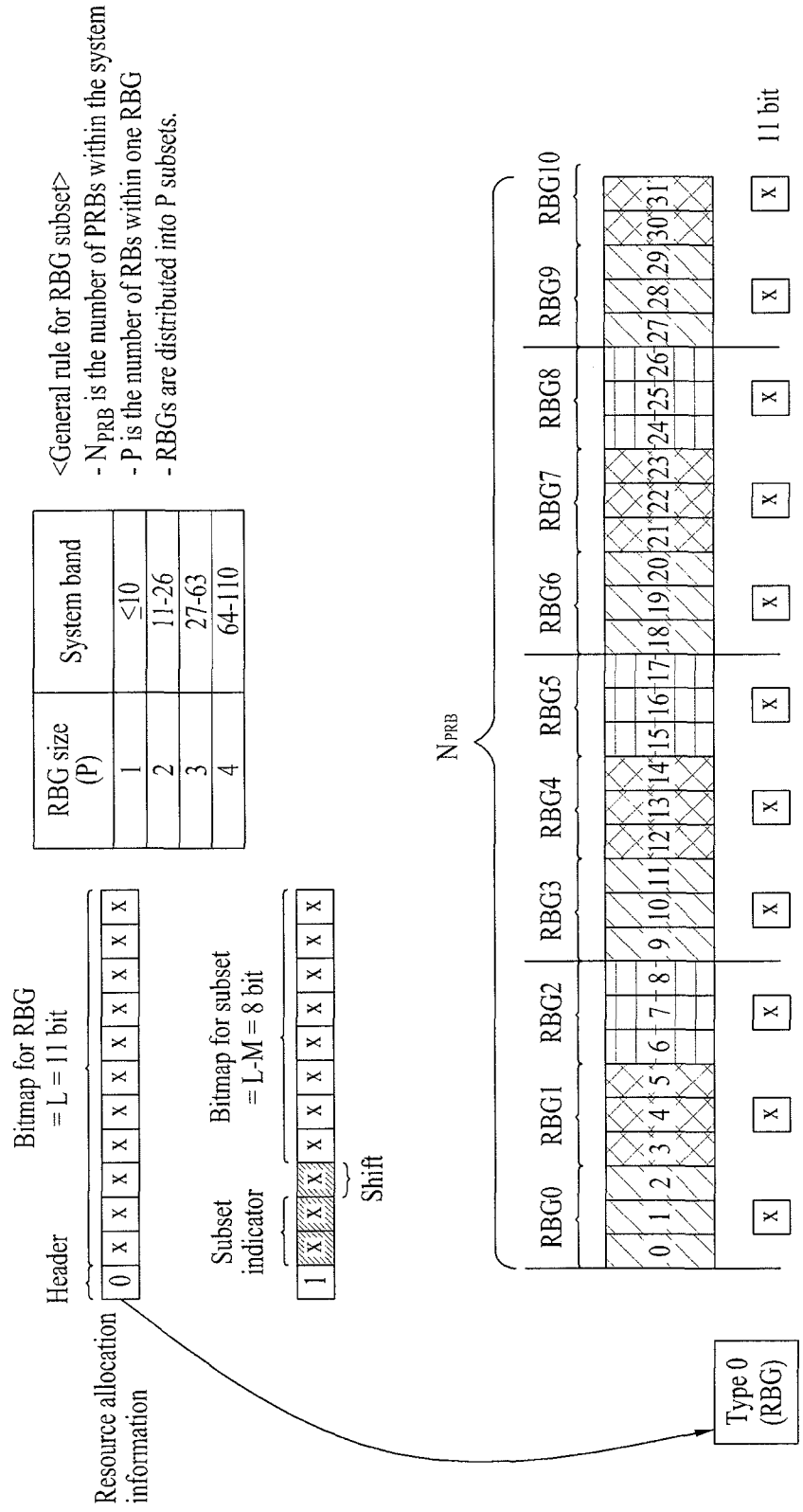
FIG. 6A to FIG. 6C are diagrams illustrating resource allocation types 0 to 2 of the existing LTE system.
Figure 6B:
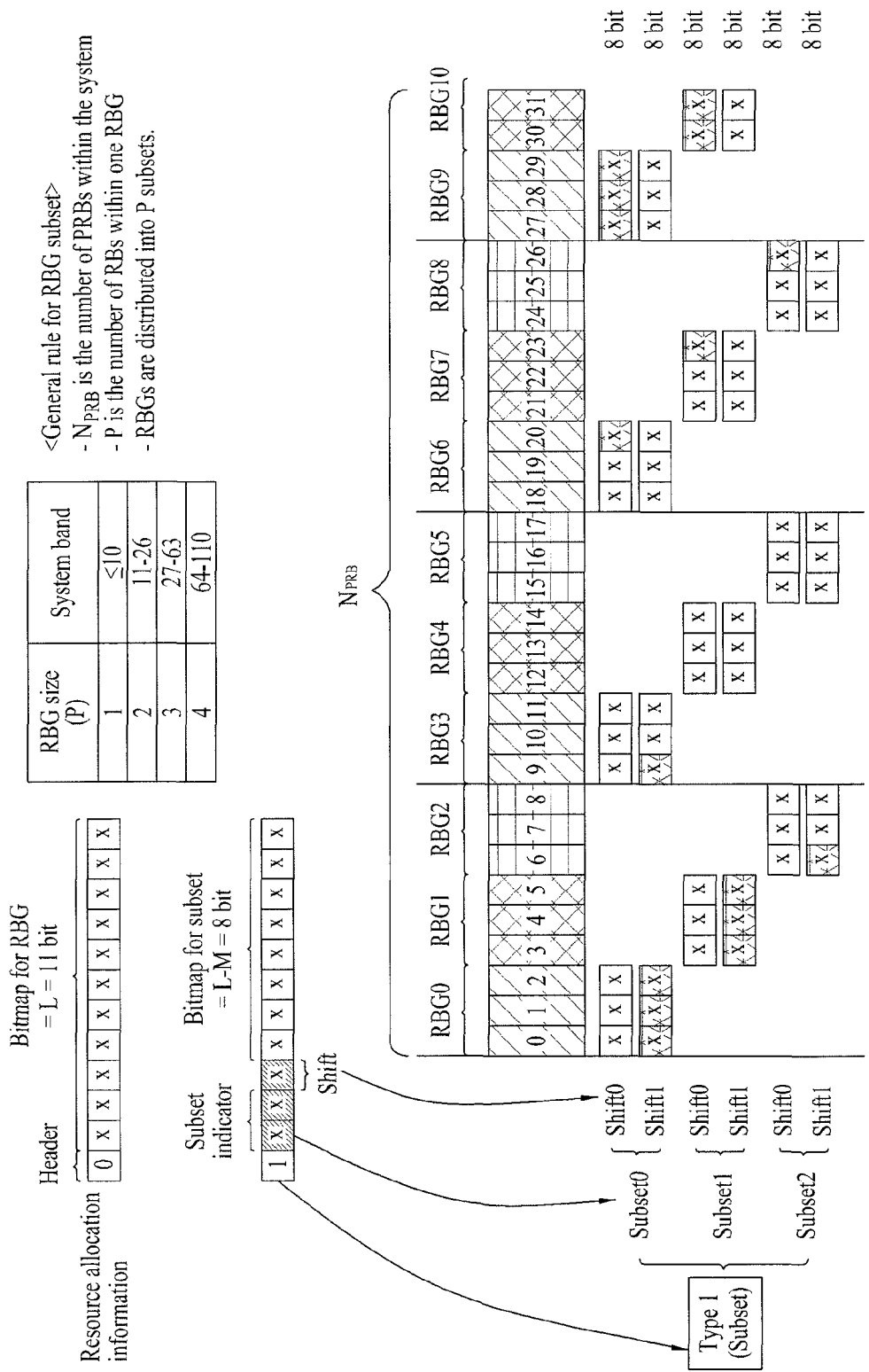
Figure 6C:
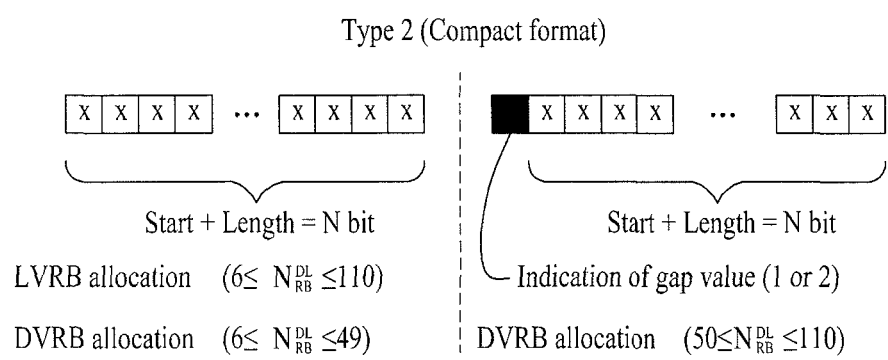

FIG. 6A to FIG. 6C are diagrams illustrating control information formats for resource allocation types 0 to 2 of the existing LTE system and resource allocation examples based on the control information formats.

The user equipment interprets a resource allocation field based on the detected PDCCH DCI formats. The resource allocation field within each PDCCH includes a resource allocation header field and two parts of actual resource block allocation information. The PDCCH DCI formats 1, 2 and 2A for resource allocation of the types 0 and 1 have the same format, and are divided from one another through a single bit resource allocation header field existing depending on a downlink system band. In more detail, the resource allocation of the type 0 is indicated by 0, and the resource allocation of the type 1 is indicated by 1. The PDCCH DCI formats 1, 2 and 2A are used for the resource allocation of the type 1, whereas the PDCCH DCI formats 1A, 1B, 1C and 1D are used for the resource allocation of the type 2. The PDCCH DCI format having the resource allocation of the type 2 does not have a resource allocation header field.

Referring to FIG. 6A, in the resource allocation of the type 0, resource block allocation information includes a bitmap indicating a resource block group (RBG) allocated to the user equipment. The RBG is a set of continuous PRBs. The RBG size (P) depends on the system band as illustrated in Table 4 below.

TABLE 4

| System band $N_{RB}^{DL}$ | RBG size (P) |
|---|---|
| ≤10 | 1 |
| 11-26 | 2 |
| 27-63 | 3 |
| 64-110 | 4 |

In a downlink system band having $N_{RB}^{DL}$ PRBs, a total number $N_{RBG}$ of RBGs is given by $N_{RBG}=\lceil N_{RB}^{DL}/P \rceil$, and $\lfloor N_{RB}^{DL}/P \rfloor$ RBGs have a size of P. In case of $N_{RB}^{DL}$ modP>0, one of the RBGs is given by a size of $N_{RB}^{DL}-P \cdot \lfloor N_{RB}^{DL}/P \rfloor$.

Also, mod represents modulo operation, $\lceil \ \rceil$ represents a ceiling function, and $\lfloor \ \rfloor$ represents a flooring function. The size of the bitmap is $N_{RBG}$, and each bit corresponds to one RBG. All the RBGs are indexed by $0 \sim N_{RBG}-1$ in a frequency direction, and RBG $0 \sim$ RBG $N_{RBG}-1$ are mapped from the most significant bit (MSB) of the bitmap into the least significant bit (LSB).

Referring to FIG. 6B, in the resource allocation of the type 1, $N_{RBG}$ sized resource block allocation information indicates resources within the RBG subset in a unit of PRB for the scheduled user equipment. The RBG subset p (0≤p<P) starts from RBG p and is configured by the Pth RBG. The resource block allocation information includes three fields. The first field includes $\lceil \log_2(P) \rceil$ bits, and indicates RBG subset selected from P RBG subsets. The second field includes 1 bit, and indicates shift of resource allocation span within the subset. If a bit value is 1, shift is triggered. If the bit value is not 1, shift is not triggered. The third field includes a bitmap, and each bit indicates one PRB within the selected RBG set. A bitmap part used to indicate the PRB within the selected RBG subset has a size of $N_{RB}^{TYPE1}$, and is defined as expressed by the Equation 2 below.

$$N_{RB}^{TYPE1} = \lceil N_{RB}^{DL}/P \rceil - \lceil \log_2(P) \rceil 1 \quad \text{[Equation 2]}$$

An addressable PRB number in the selected RBG subset starts from offset ($\Delta_{shift}(p)$) for the smallest PRB number within the selected RBG subset, and may be mapped into the MSB of the bitmap. The offset is expressed by the number of PRBs, and is applied within the selected RBG subset. If the bit value within the second field for shift of the resource allocation span is set to 0, offset for the RBG subset p is given by $\Delta_{shift}(p)=0$. In other case, the offset for the RBG subset p is given by $\Delta_{shift}(p)=N_{RB}^{RBG\ subset}(p)-N_{RB}^{TYPE1} \cdot N_{RB}^{RBG\ subset}(p)$ represents the number of PRBs within the RBG subset p, and may be obtained by the Equation 3 below.

$$N_{RB}^{RBGsubset}(p) = \begin{cases} \left\lfloor \frac{N_{RB}^{DL}-1}{P^2} \right\rfloor \cdot P + P & , p < \left\lfloor \frac{N_{RB}^{DL}-1}{P} \right\rfloor \mod P \\ \left\lfloor \frac{N_{RB}^{DL}-1}{P^2} \right\rfloor \cdot P + (N_{RB}^{DL}-1) \mod P + 1 & , p = \left\lfloor \frac{N_{RB}^{DL}-1}{P} \right\rfloor \mod P \\ \left\lfloor \frac{N_{RB}^{DL}-1}{P^2} \right\rfloor \cdot P & , p > \left\lfloor \frac{N_{RB}^{DL}-1}{P} \right\rfloor \mod P \end{cases} \quad \text{[Equation 3]}$$

Referring to FIG. 6C, the resource block allocation information in the resource allocation of the type 2 represents a set of LVRBs or DVRBs continuously allocated to the scheduled user equipment. If resource allocation is signaled by the PDCCH DCI format 1A, 1B or 1D, a 1-bit flag indicates whether the LVRBs or DVRBs are allocated (for example, 0 represents LVRB allocation, and 1 represents DVRB allocation.). On the other hand, if resource allocation is signaled by the PDCCH DCI format 1C, only the DVRBs are always allocated. The type 2 resource allocation field includes a resource indication value (RIV), which corresponds to a start resource block $RB_{start}$ and length. The length represents the number of virtual resource blocks allocated continuously.

Figure 7A:
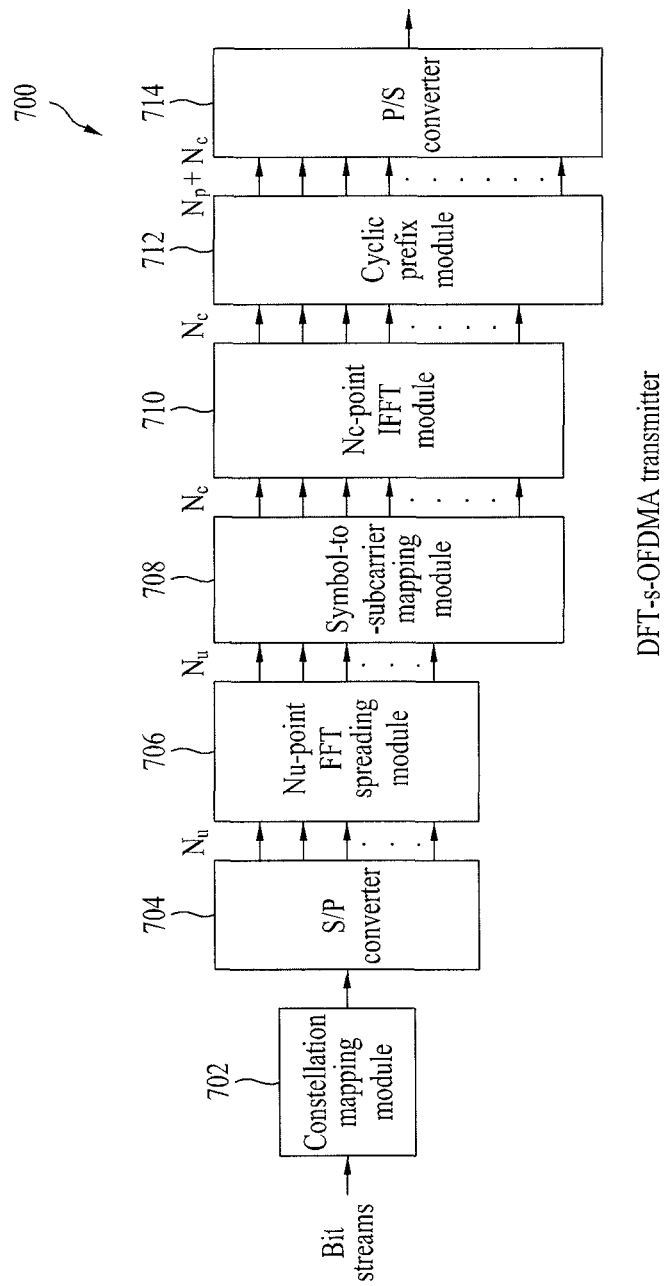
FIG. 7A and FIG. 7B are diagrams illustrating discrete fourier transform spread orthogonal frequency division multiple access (DFT-s-OFDMA) transmitter/receiver.
Figure 7B:
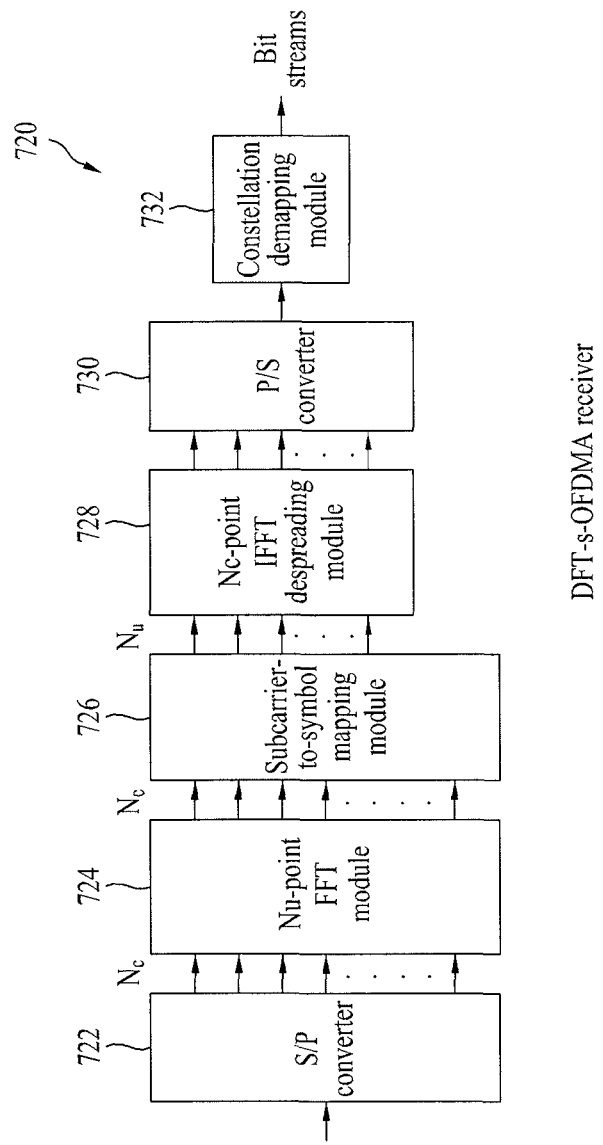

FIG. 7A and FIG. 7B are diagrams illustrating discrete fourier transform spread orthogonal frequency division multiple access (DFT-s-OFDMA) transmitter/receiver. A DFT-s-OFDMA scheme is different from the OFDMA scheme in that a plurality of data symbols (i.e., data symbol sequences) are distributed in the frequency domain through DFT precoding prior to IFFT processing. The DFT-s-OFDMA scheme is referred to as an SC-FDMA scheme. In this specification, the DFT-s-OFDMA scheme and the SC-FDMA scheme will be used together.

Referring to FIG. 7A, the DFT-s-OFDMA transmitter 700 includes a constellation mapping module 702, a serial to parallel converter 704, an Nu-point FFT spreading module 706, a symbol-to-subcarrier mapping module 708, an Nc-point IFFT module 710, a cyclic prefix module 712, and a parallel to serial converter 714. These modules are illustrated to describe the embodiment of the present invention, and the DFT-s-OFDMA transmitter 700 may further include additional modules. Also, functions of some modules may be united into one module. In this case, Nu is an input size of the FFT spreading module, and corresponds to the number of scheduled subcarriers. Also, Nc corresponds to the number of all subcarriers existing within the system band. Accordingly, the Nu value and DFT input and output size based on the Nu value may be varied within the range of Nu≤Nc depending on data symbols scheduled per scheduling time.

A signal processing procedure of the DFT-s-OFDMA transmitter 700 will be described as follows. First of all, bit streams are modulated to data symbol sequences (702). Afterwards, the serial data symbol sequences are converted into parallel data symbol sequences as much as Nu. The parallel data symbol sequences of the Nu length are converted into frequency domain sequences of the Nu length through FFT processing of the same size (706). The FFT processing may be performed through Nu-point DFT processing. In this specification, FFT may be referred to as DFT. DFT processing may be referred to as DFT spreading or DFT precoding. Then, the frequency domain sequences of the Nu length are mapped into Nu allocated subcarriers among a total of Nc subcarriers, and the other Nc-Nu subcarriers are padded with 0 (708). The sequences mapped into the Nc subcarriers are converted into time domain sequences of the Nc length through Nc-point IFFT processing (710). In order to reduce inter-symbol interference (ISI) and inter-carrier interference (ICI), cyclic prefix is configured in such a manner that Np samples among the time domain sequences are copied and added to the front of the sequences (712). The generated time domain sequences correspond to one transmission symbol and are converted to the serial sequences through the parallel to serial converter (714). Then, the serial sequences are transmitted to the receiver through frequency up-conversion. Available subcarriers from the other Nc-Nu subcarriers remaining after being used by the previous user are allocated to the other user, so that the other user transmits the allocated data.

Referring to FIG. 7B, the receiver 720 includes a serial to parallel converter 722, an Nc-point FFT module 724, a subcarrier-to-symbol mapping module 726, an Nu-point DFT despreading module 728, a parallel to serial converter 730, and a constellation demapping module 732. Because a signal processing procedure of the receiver 720 is configured in reverse order of the transmitter 700, its detailed description may refer to the description of FIG. 7A.

In case of the LTE, the OFDMA scheme is used in a downlink, whereas the SC-FDMA scheme is used in an uplink. The OFDMA transmitter corresponds to the block diagram of FIG. 7A excluding the Nu-point FFT spreading module 706, and the OFDMA receiver corresponds to the block diagram of FIG. 7B excluding the Nu-point DFT despreading module 728.

Hereinafter, a method for mapping frequency domain sequences generated by DFT precoding into subcarriers will be described with reference to FIG. 8 and FIG. 9. In the existing LTE, one continuous frequency resource has been allocated to one user equipment in the uplink. However, in accordance with request of high speed communication and in order to maximize use of frequency resources, the LTE-A (since Rel-10) system allows allocation of a plurality of discontinuous frequency resources as well as one continuous frequency resource to one user equipment in the uplink.

Figure 8:
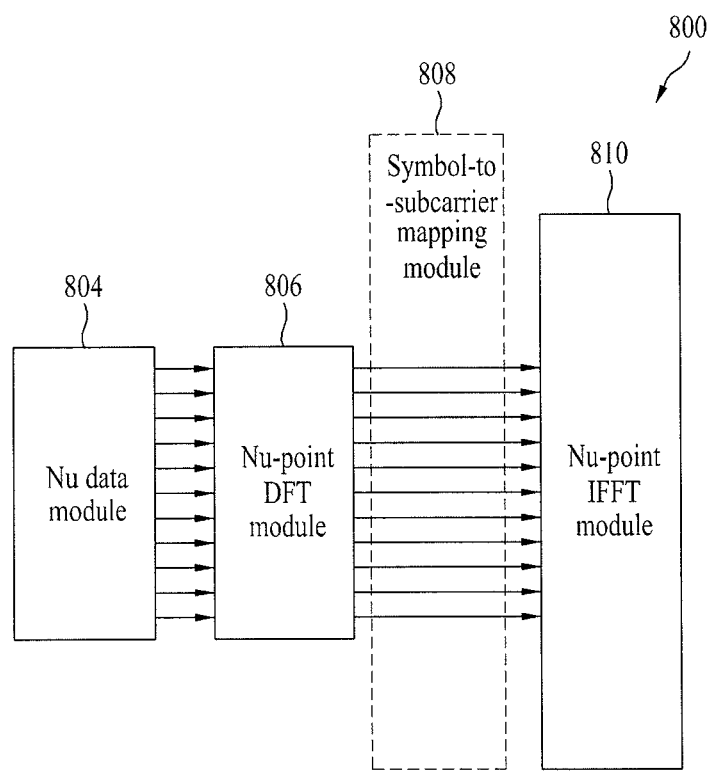
FIG. 8 is a diagram illustrating localized DFT-s-OFDMA resource mapping.

FIG. 8 is a block diagram illustrating a localized DFT-s-OFDMA transmitter 800. FIG. 8 corresponds to a method for resource allocation in the existing LTE.

Referring to FIG. 8, for Nu data 804, the frequency domain sequences output from the DFT module 806 are mapped into continuous subcarriers within the system band (808), and then processed by Nc-point IFFT module 810. In other words, the frequency domain sequences of the Nu length are mapped into Nu continuous subcarriers. Because the method of FIG. 8 allows data transmission through continuous subcarriers at a given time, scheduling flexibility may be deteriorated. For example, if the transmitter and the receiver have good radio channel response properties in a plurality of frequency domains spaced apart from one another at a random time, this method does not allow data transmission to the frequency domains, which are spaced apart from one another, at the same time.

Figure 9:
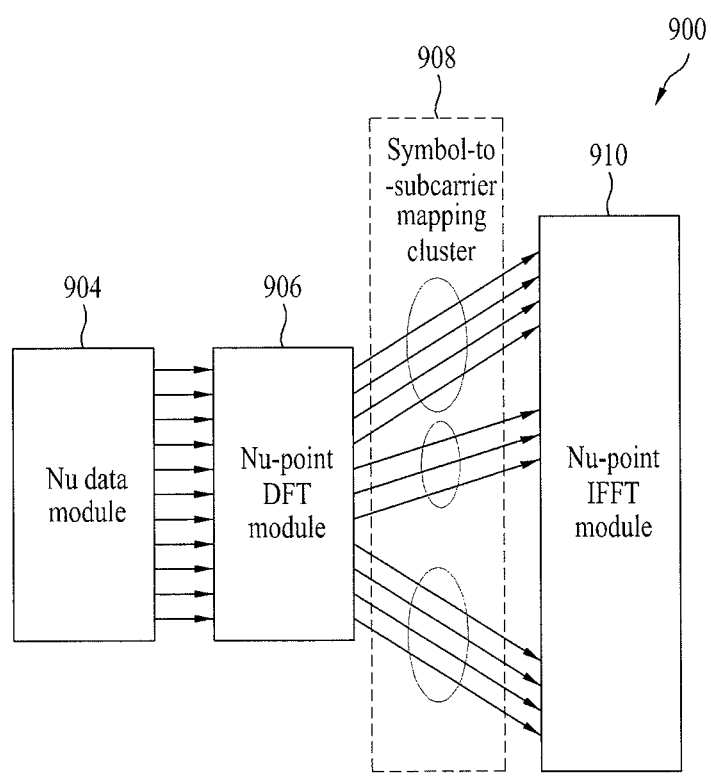
FIG. 9 is a diagram illustrating clustered DFT-s-OFDMA resource mapping.

FIG. 9 is a block diagram illustrating a clustered DFT-s-OFDMA transmitter 900. FIG. 9 corresponds to a method for resource allocation, which is additionally used in the LTE-A. A user equipment of the LTE-A may use the method of FIG. 8 or the method of FIG. 9 based on resource allocation information.

Referring to FIG. 9, for Nu data 904, the frequency domain sequences output from the DFT module 906 are mapped into the system band irregularly and discontinuously (908), and then processed by Nc-point IFFT module 910. According to this method of FIG. 9, the localized DFT-s-OFDMA scheme is independently applied to the plurality of frequency domains spaced apart from one another. For convenience, each resource set (or frequency band) to which the localized DFT-s-OFDMA scheme is applied will be referred to as a cluster. The cluster includes one or more continuous subcarriers. Accordingly, in this method, a plurality of data symbols which have been processed by DFT precoding are mapped into the continuous subcarriers within M(≥1) clusters spaced apart from one another in the frequency domain. FIG. 9 illustrates three clusters. Sizes (for example, subcarriers, RB or the number of RBGs) of the clusters may be set independently. A PAPR value of a transmitting signal is greater than that of the localized DFT-s-OFDMA scheme if the value of M is greater than 1. However, if the value of M is set within a small range, a PAPR value smaller than that of the OFDMA scheme is ensured and at the same time scheduling flexibility can be improved.

Embodiment

With the introduction of a method (for convenience, referred to as UL RA type N) for discontinuous uplink resource allocation to the LTE-A system, various methods for efficiently signaling the UL RA type N have been discussed in the art.

As the first method, a method for using a bitmap separately indicating UL RB (or RBG) such as DL RA type 0 has been suggested. According to this method, perfect the scheduling freedom is ensured during discontinuous resource allocation. However, if there are n RBs (or RBGs) in UL band, since RA field of n bits is required, the amount of control information may be increased extremely. Moreover, considering that a size of the RA field for existing PUSCH scheduling is defined as $\lceil \log_2(N_{RB}^{UL}(N_{RB}^{UL}+1)/2) \rceil$, a new DCI format should be defined to support this method.

As the second method, a method for restricting a resource region to which each cluster may be allocated while reusing the existing continuous allocation method (RA type 2) has been suggested. For example, if the UL band includes ten RBGs, the first cluster may be allocated within the RBGs 0 to 4 only, and the second cluster may be allocated within the RBGs 5 to 9 only. In this case, the size of the RA field may be given by $2 \cdot \lceil \log_2(N_{RBG}^{Cluster\ Span} \cdot (N_{RBG}^{Cluster\ Span}+1)/2) \rceil$ represents a size of a region to which each cluster may be allocated, and has a size of RBG unit. According to this method, as the size of $N_{RBG}^{Cluster\ Span}$ is adjusted, discontinuous resource allocation may be performed using the existing RA field. However, since the region to which each cluster may be allocated is restricted, a problem occurs in that the scheduling freedom is reduced.

As described above, if a bitmap indicating a separate RB (or RBG) is used during discontinuous uplink resource allocation, the amount of control information may be increased considerably. For this reason, a problem occurs in that the existing DCI format cannot be reused. Also, if the existing continuous allocation method (that is, RIV) and DCI format are reused during discontinuous uplink resource allocation, since the region to which the cluster may be allocated is restricted to maintain the size of the existing DCI format, a problem occurs in that the scheduling freedom is reduced.

Hereinafter, a method for discontinuous uplink resource allocation, which can ensure the scheduling freedom while not increasing the amount of information for resource allocation, will be described with reference to the drawings. In more detail, the present invention suggests that a combinatorial index corresponding to a plurality of resource sets allocated discontinuously should be used. The combinatorial index may be included in the RA field of the DCI format for PUSCH scheduling. The combinatorial index is used to indicate that specific combinatorial indexes are selected from all combinatorial indexes. For convenience, a set of specific combinatorial indexes is expressed as $\{S_i\}_{i=0}^{M'-1}$. In this case, M'=2M, and M represents the number of allocated resource sets (for example, clusters). Also, $\{S_0, S_1\}$ corresponds to the first resource set, and $\{s_2, s_3\}$ corresponds to the second resource set. In other words, $\{S_{2m-2}, S_{2m-1}\}$ corresponds to the m (m=1, 2, ..., M)th resource set. The correspondence relation may be defined differently. A method for resource allocation based on combinatorial indexes will later be described in more detail.

First of all, a total number of RBs corresponding to all UL system bandwidths or UL bandwidths available for resource allocation will be defined as $N_{RB}^{UL}$. For convenience, although RBG is used as a minimum granularity for resource allocation in this embodiment, this is only exemplary and may be defined differently. If the number of RBs constituting RBG is P (P=1, 2, ...), a total of $N_{RBG}^{UL}$ RBGs for resource allocation may be defined for a total of $N_{RB}^{UL}$ RBs. In more detail, $N_{RBG}^{UL}$ may be given by $\lceil N_{RB}^{UL}/P \rceil$ (or, ceiling ($N_{RB}^{UL}/P$)). In this case, $\lceil x \rceil$ or ceiling(x) represents a minimum integer greater than or equal to x. In the mean time, $N_{RBG}^{UL}$ may be given by $\lfloor N_{RB}^{UL}/P \rfloor$ (or floor ($N_{RB}^{UL}/P$)) or round ($N_{RB}^{UL}/P$) depending on definition and size of the resource allocation field. In this case, $\lfloor x \rfloor$ or floor(x) represents a maximum integer smaller than or equal to x. Also, round(x) means round-off for x.

Furthermore, the number of resource sets (for example, RBG clusters) discontinuously allocated to the user equipment is defined as M (M=2, 3, ...). In this case, M may be set to all the user equipments equally (that is, cell-specifically), or may be set independently per user equipment (that is, UE-specifically). Preferably, M=2 may be fixed to all the user equipments.

Figure 10:
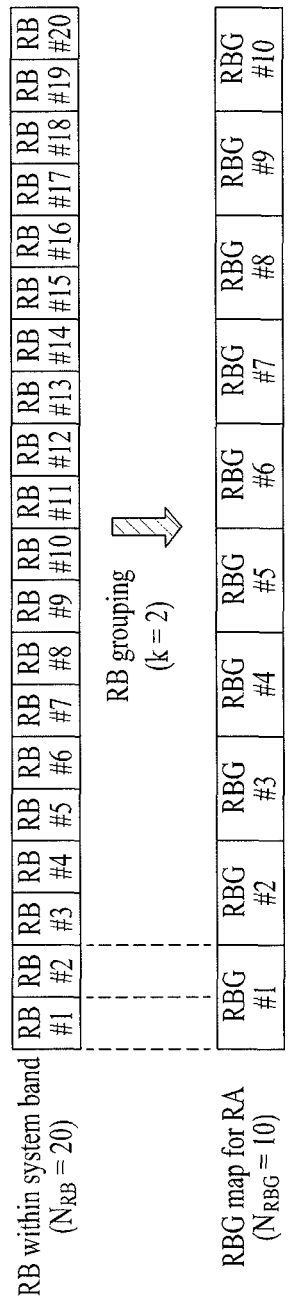
FIG. 10 is a diagram illustrating RBG grouping.

FIG. 10 is a diagram illustrating an example of RBG indexing based RBG map for resource allocation. In FIG. 10, it is assumed that the UL band includes twenty RBs ($N_{RB}^{UL}$=20). In this case, referring to Table 4, the RBG includes two RBs. In this respect, RB #1~#20 is grouped into RBG #1~#10. Hereinafter, the RBG is used as the basic UL resource allocation unit. Although FIG. 10 illustrates that RB indexes and RBG indexes start from 1, they may be defined such that they start from 0.

Method 1: Indication of Combination of RBG Indexes by Combinatorial Indexes

This method illustrates a method for allocating a plurality of discontinuous uplink resource sets (for example, RBG clusters) based on RBG indexing. For convenience, a starting RBG index and an ending RBG index of the RBG clusters allocated to the user equipment will be referred to as S and E, respectively. A starting RBG index and an ending RBG index of the mth RBG set will be referred to as $S_m$ and $E_m$, respectively. For convenience, a case where two RBG clusters are allocated will be described. In this case, combinatorial indexes may be used to indicate $\{S_i\}_{i=0}^{M'-1}$ (M'=4).

For resource allocation, $\{s_0, s_1\}=\{S_1, E_1\}$ and $\{s_2, s_3\}=\{S_2, E_2\}$ may be defined similarly. However, considering that the RBG cluster includes one RBG, the combinatorial indexes should indicate combination of $s_0=s_1$ and/or $s_2=s_3$. In this case, since the number of all combinations is increased by repeated selection, much more control information may be required. Accordingly, in order to avoid repeated selection, restriction of $s_i < s_{i+1}$ may be considered. However, if restriction of $s_i < s_{i+1}$ is considered, a problem occurs in that a resource set configured by one RBG cannot be allocated.

Accordingly, the following methods may be considered.
Method 1-1: $\{s_0, s_1\}=\{S_1, E_1+1\}$, $\{s_2, s_3\}=\{S_2, E_2+1\}$
Method 1-2: $\{s_0, s_1\}=\{S_1-1, E_1\}$, $\{s_2, s_3\}=\{S_2-1, E_2\}$ According to the method 1-1, the RBG index of the allocated resource set is given by $\{S_m, E_m\}=\{s_{2m-2}, s_{2m-1}-1\}$ (m=1, 2, ..., M). Similarly, according to the method 1-2, the RBG index of the allocated resource set is given by $\{S_m, E_m\}=\{s_{2m-2}+1, s_{2m-1}\}$.

Hereinafter, the methods 1-1 and 1-2 will be described in more detail with reference to the drawings.

Method 1-1: Indication of Starting/Ending-Rear RBG of RBG Cluster

Figure 11:
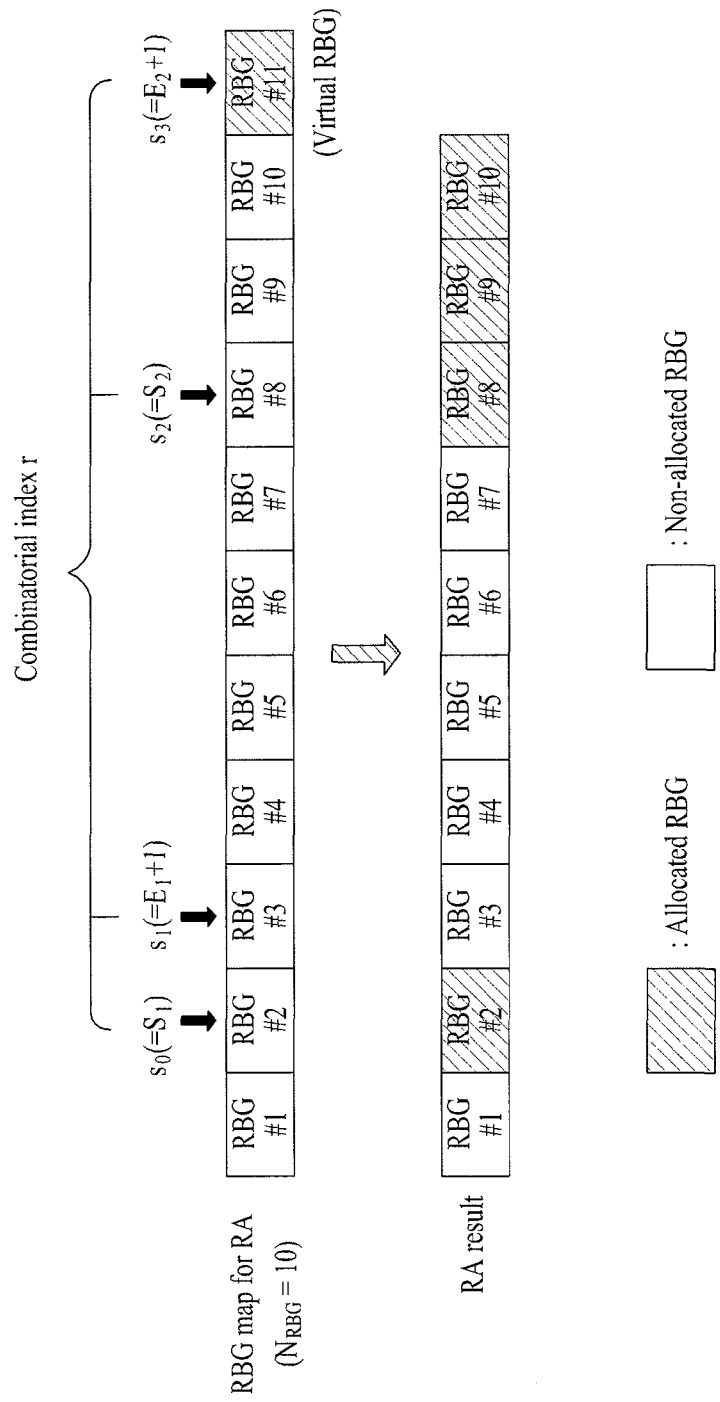
FIG. 11 to FIG. 13B are diagrams illustrating a method for discontinuous uplink resource allocation according to the embodiment of the present invention.

FIG. 11 is a diagram illustrating a method for resource allocation according to the method 1-1.

Referring to FIG. 11, this method is based on RBG indexing, and $\{S_m, E_m+1\}$ (that is, starting RBG index and ending-rear RBG index) is notified to each of M RBG clusters, which are allocated to the user equipment, among a total of $N_{RBG}$ RBGs. As described above, the combinatorial index included in the DCI format for PUSCH scheduling indicates $\{s_i\}_{i=0}^{M'-1}$ (M'=2M), and the user equipment may identify $\{S_m, E_m\}$ from the relation of $\{s_{2m-2}, s_{2m-1}\}=\{S_m, E_m+1\}$.

In case of this method, in order that the ending RBG of the RBG cluster may be allocated to the last RBG index, a virtual RBG may additionally be defined at the rear (high RBG index direction) of the last RBG index as illustrated in FIG. 11. In this case, in case of the virtual RBG, actual resource allocation cannot be performed and is used for indexing only.

In this method, 2M (=M') indexes for allocation of M RBG clusters may be encoded to different bits or encoded to different bits per cluster, or may be joint-encoded together with all the indexes of all the clusters to reduce the number of bits required for resource allocation. Also, as described above, in this method, 2M(=M') indexes for identifying M RBG clusters may be selected in case of only combination having no repetition. For convenience, if $N=N_{RBG}$, a total number of RBG indexes become N+1 including a virtual RBG. Accordingly, in this method, the number of bits required for resource allocation becomes ceiling ($\log_2(_{N+1}C_{2M})$). In more detail, when N+1 RBG indexes from 1 to N+1 are defined in this method, a combinatorial index r for signaling resource allocation of M RBG clusters may be expressed as follows.

$$r = \sum_{i=0}^{M'-1} \binom{(N+1)-s_i}{M'-i}, \quad \text{[Equation 4]}$$

$$\binom{x}{y} = \begin{cases} \binom{x}{y} & \text{if } x \geq y \\ 0 & \text{if } x < y \end{cases}$$

In this case, $\{s_i\}_{i=0}^{M'-1}$ ($1 \leq s_i \leq N+1$, $s_i < s_{i+1}$) means M'(=2M) RBG indexes subjected to sorting.

$$\binom{x}{y}$$

represents $$\frac{x(x-1)\ldots(x-y+1)}{y(y-1)\ldots 1} = \frac{x!}{(x-y)!y!}.$$

In another method, when N+1 RBG indexes from 0 to N are defined, the combinatorial index r for signaling resource allocation of M RBG clusters may be expressed as follows.

$$r = \sum_{i=0}^{M'-1} \binom{(N)-s_i}{M'-i}, \quad \text{[Equation 5]}$$

$$\binom{x}{y} = \begin{cases} \binom{x}{y} & \text{if } x \geq y \\ 0 & \text{if } x < y \end{cases}$$

In this $\{s_i\}_{i=0}^{M'-1}$ ($0 \leq s_i \leq N$, $s_i < s_{i+1}$) means M'(=2M) RBG indexes subjected to sorting.

$$\binom{x}{y}$$

represents $$\frac{x(x-1)\ldots(x-y+1)}{y(y-1)\ldots 1}.$$

In the Equations 4 and 5, N may be given by the following Equation.

$$\lceil N_{RB}^{UL}/P \rceil + 1 \quad \text{[Equation 6]}$$

In this case, $N_{RB}^{UL}$ represents the number of resource blocks of the uplink band. P represents the number of resource blocks constituting RBG. ⌈ ⌉ represents a ceiling function.

Table 5 illustrates RBG size (P) depending on the system band.

TABLE 5

| System band $N_{RB}^{UL}$ | RBG size (P) |
|---|---|
| ≤10 | 1 |
| 11-26 | 2 |
| 27-63 | 3 |
| 64-110 | 4 |

Additionally, in this method, $\{E_m+1\}=\{s_{2m-1}\}$ may be interpreted as a starting RBG index of a non-allocation RBG region adjacent to the rear of the mth RBG cluster.

Method 1-2) Indication of Starting-Front/Ending RBG of RBG Cluster

Figure 12:
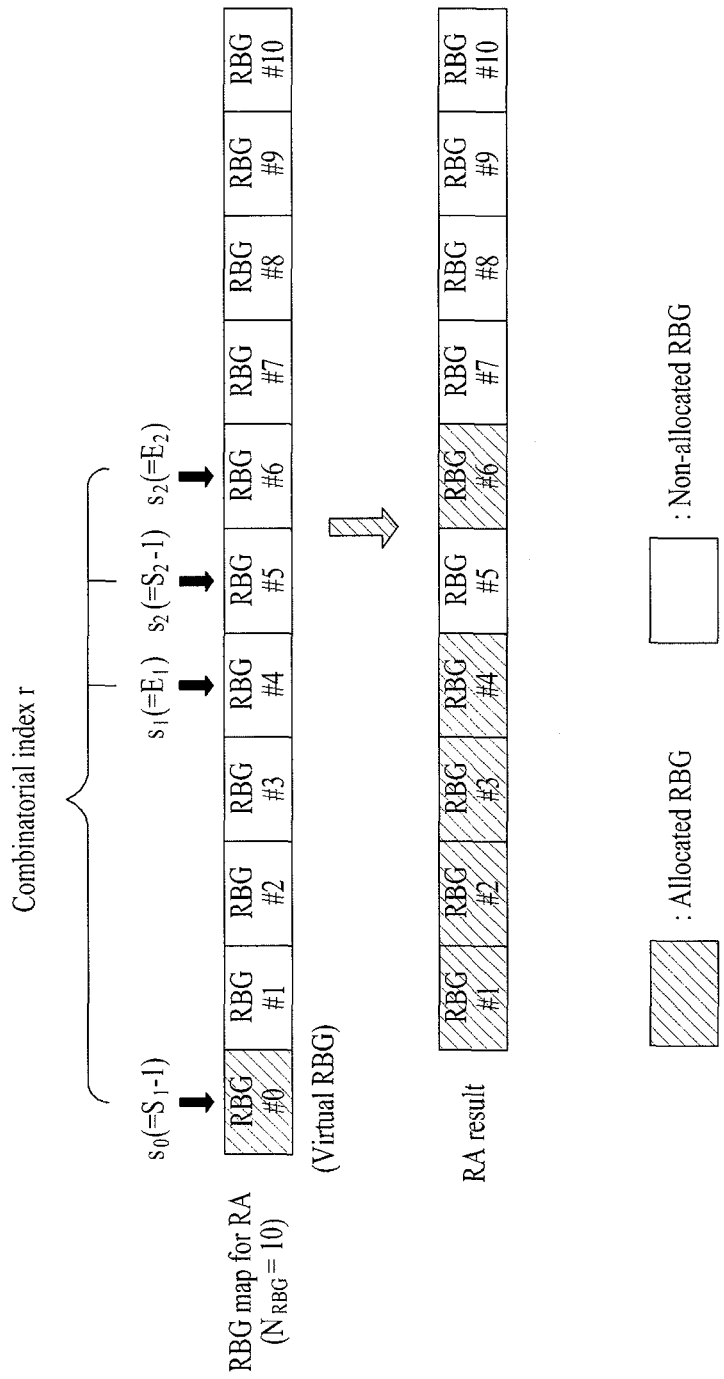

FIG. 12 is a diagram illustrating a method for resource allocation according to the method 1-2.

Referring to FIG. 12, this method is based on RBG indexing, and $\{S_m-1, E_m\}$ (that is, starting-front RBG index and ending RBG index) is notified to each of M RBG clusters, which are allocated to the user equipment, among a total of $N_{RBG}$ RBGs. As described above, the combinatorial index included in the DCI format for PUSCH scheduling indicates $\{s_i\}_{i=0}^{M'-1}$ (M'=2M), and the user equipment may identify $\{S_m, E_m\}$ from the relation of $\{s_{2m-2}, s_{2m-1}\}=\{S_m-1, E_m\}$.

In case of this method, in order that the ending RBG of the RBG cluster may be allocated to the last RBG index, a virtual RBG may additionally be defined at the front (low RBG index direction) of the first RBG index as illustrated in FIG. 12. In this case, in case of the virtual RBG, actual resource allocation cannot be performed and is used for indexing only.

In this method, 2M (=M') indexes for allocation of M RBG clusters may be encoded to different bits or encoded to different bits per cluster, or may be joint-encoded together with all the indexes of all the clusters to reduce the number of bits required for resource allocation. Also, as described above, in this method, 2M(=M') indexes for identifying M RBG clusters may be selected in case of only combination having no repetition. For convenience, if $N=N_{RBG}$, a total number of RBG indexes become N+1 including a virtual RBG. Accordingly, in this method, the number of bits required for resource allocation becomes ceiling ($\log_2(_{N+1}C_{2M})$)

When N+1 RBG indexes from 1 to N+1 are defined in this method, a combinatorial index r for signaling resource allocation of M RBG clusters may be expressed as given by the Equation 4. Also, when N+1 RBG indexes from 0 to N are defined, the combinatorial index r for signaling resource allocation of M RBG clusters may be expressed as given by the Equation 5.

Additionally, in this method, $\{S_m-1\}=\{s_{2m-2}\}$ may be interpreted as an ending RBG index of a non-allocation RBG region adjacent to the front of the mth RBG cluster.

Method 2: Indication of Combination of RBG Borders by Combinatorial Index

This method illustrates a method for allocating a plurality of discontinuous uplink resource sets (for example, RBG clusters) based on RBG border indexing. For convenience, a starting RBG border index and an ending RBG border index of the RBG clusters allocated to the user equipment will be referred to as SB and EB, respectively. A starting RBG border index and an ending RBG border index of the mth RBG set will be referred to as $SB_m$ and $EB_m$, respectively. For convenience, a case where two RBG clusters are allocated will be described. In this case, combinatorial indexes may be used to indicate $\{s_i\}_{i=0}^{M'-1}$(M'=4).

Figure 13A:
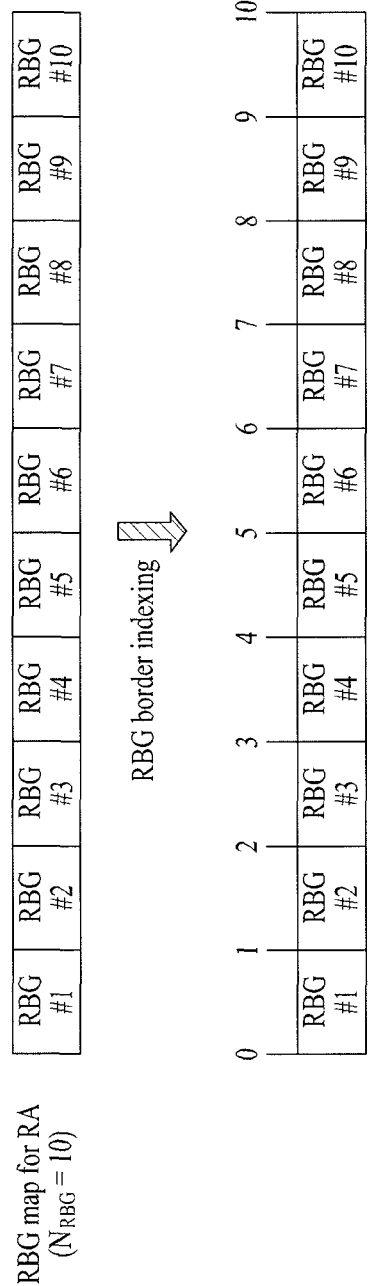
Figure 13B:
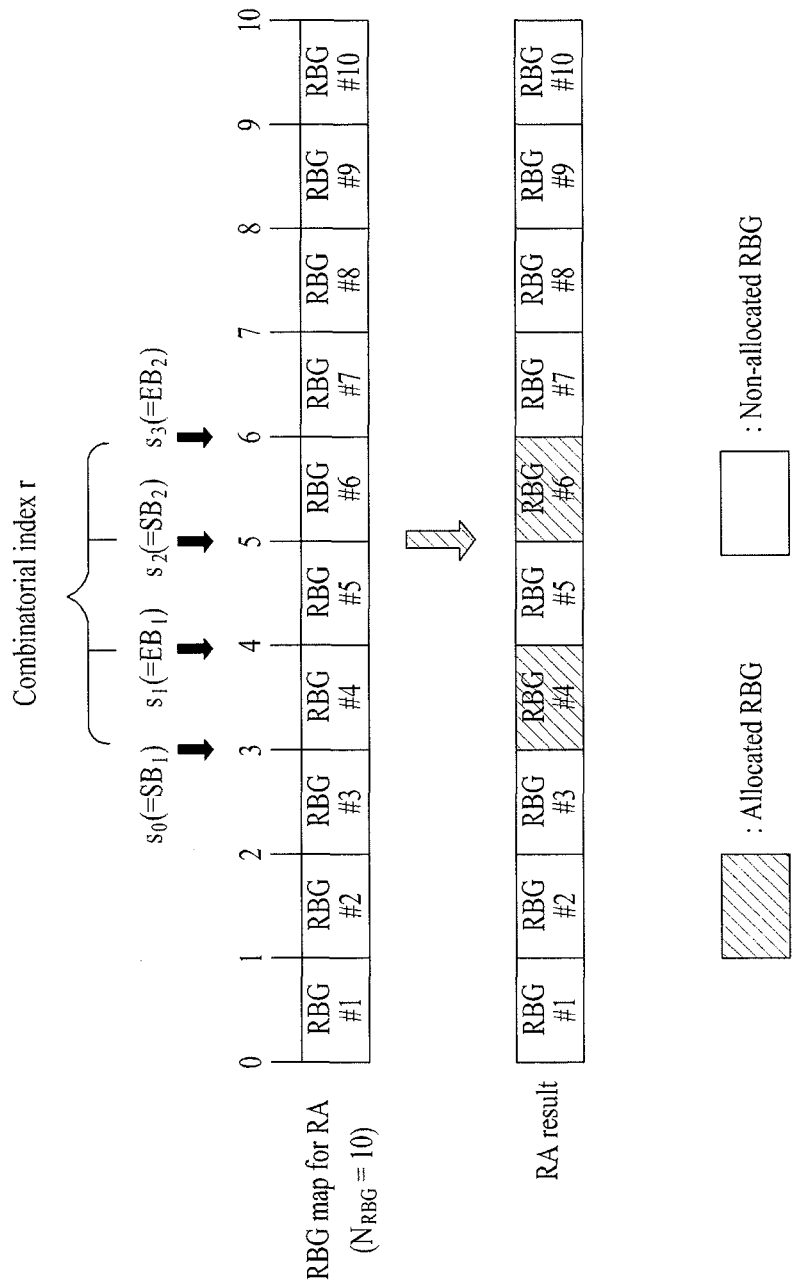

FIGS. 13A and 13B are diagrams illustrating a method for resource allocation according to the method 2.

Referring to FIGS. 13A and 13B, this method is based on RBG border indexing, and $\{SB_m, EB_m\}$ (that is, starting RBG border index and ending RBG border index) is notified to each of M RBG clusters, which are allocated to the user equipment, among a total of $N_{RBG}$ RBGs. As described above, the combinatorial index included in the DCI format for PUSCH scheduling indicates $\{s_i\}_{i=0}^{M'-1}$ (M'=2M), and the user equipment may identify $\{SB_m, EB_m\}$ from the relation of $\{s_{2m-2}, s_{2m-1}\} = \{SB_m, EB_m\}$.

In this method, 2M (=M') indexes for allocation of M RBG clusters may be encoded to different bits or encoded to different bits per cluster, or may be joint-encoded together with all the indexes of all the clusters to reduce the number of bits required for resource allocation. Also, as described above, in this method, 2M(=M') indexes for identifying M RBG clusters may be selected in case of only combination having no repetition. For convenience, if $N=N_{RBG}$, a total number of RBG indexes become N+1. Accordingly, in this method, the number of bits required for resource allocation becomes ceiling $(\log_2({}_{N+1}C_{2M}))$.

When N+1 RBG indexes from 1 to N+1 are defined in this method, a combinatorial index r for signaling resource allocation of M RBG clusters may be expressed as follows.

$$r = \sum_{i=0}^{M'-1} \binom{(N+1) - s_i}{M' - i}, \quad \text{[Equation 7]}$$

$$\binom{x}{y} = \begin{cases} \binom{x}{y} & \text{if } x \geq y \\ 0 & \text{if } x < y \end{cases}$$

In this case, $\{s_i\}_{i=0}^{M'-1}$ ($1 \leq s_i \leq N+1$, $s_i < s_{i+1}$) means M'(=2M) RBG border indexes subjected to sorting.

$$\binom{x}{y}$$

represents $$\frac{x(x-1)\ldots(x-y+1)}{y(y-1)\ldots 1}.$$

In another method, when N+1 RBG indexes from 0 to N are defined, the combinatorial index r for signaling resource allocation of M RBG clusters may be expressed as follows.

$$r = \sum_{i=0}^{M'-1} \binom{N - s_i}{M' - i}, \quad \text{[Equation 8]}$$

$$\binom{x}{y} = \begin{cases} \binom{x}{y} & \text{if } x \geq y \\ 0 & \text{if } x < y \end{cases}$$

In this case, $\{s_i\}_{i=0}^{M'-1}$ ($0 \leq s_i \leq N$, $s_i < s_{i+1}$), means M'(=2M) RBG border indexes subjected to sorting.

$$\binom{x}{y}$$

represents $$\frac{x(x-1)\ldots(x-y+1)}{y(y-1)\ldots 1}.$$

In case of the method 2, RBG border indexing not the RBG indexing is used, whereas definition of additional virtual RBG is not required unlike the method 1.

Figure 14:
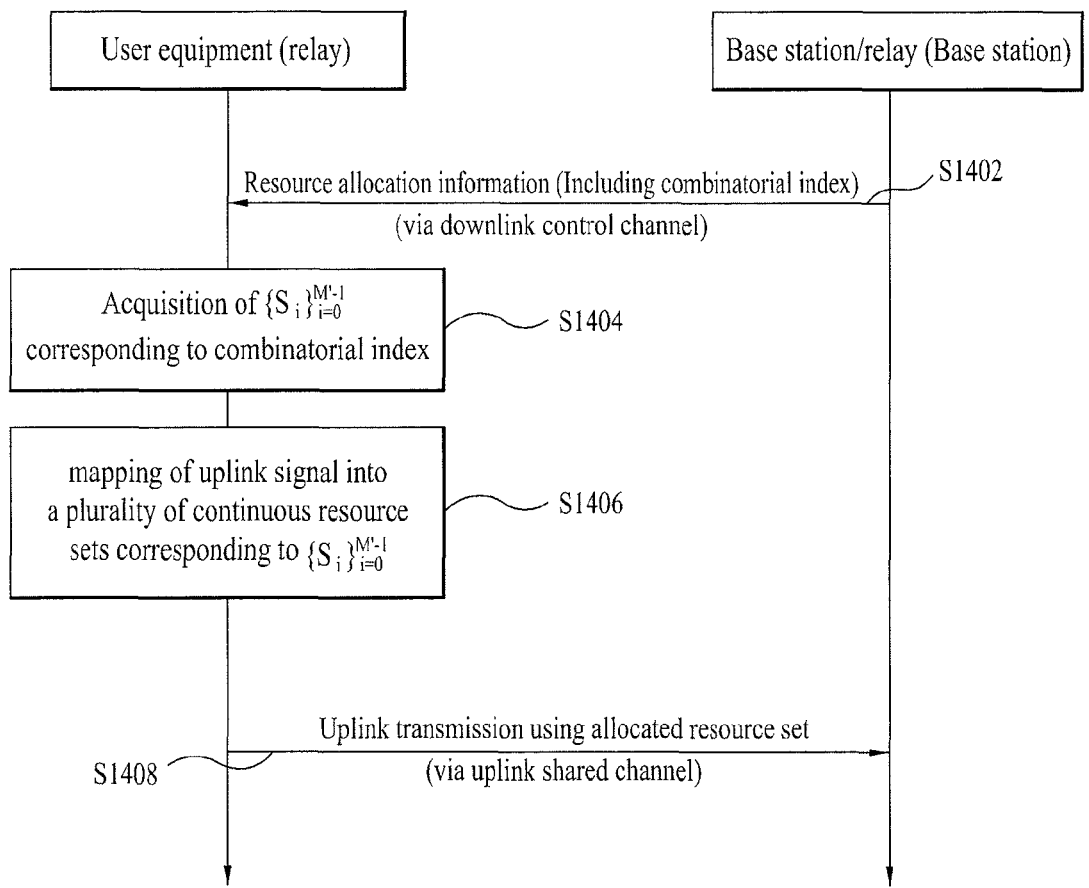

FIG. 14 is a diagram illustrating an example of uplink transmission according to the embodiment of the present invention.

Referring to FIG. 14, the user equipment receives resource allocation information including combinatorial indexes from a network node (for example, base station or relay) (S1402). A field for resource allocation information is included in the DCI, and may be received through a downlink control channel (for example, PDCCH). If a PDCCH having a DCI format for PUSCH scheduling is detected from a subframe n, the user equipment performs a process for PUSCH transmission based on PDCCH information at the subframe n+4. To this end, the user equipment interprets resource allocation information. In more detail, the user equipment acquires $\{s_i\}_{i=0}^{M'-1}$ corresponding to the combinatorial index (S1404), and identifies a resource set corresponding to the acquired one (S1404). Afterwards, the user equipment maps an uplink signal into a plurality of continuous resource sets (for example, RBG clusters) corresponding to $\{s_i\}_{i=0}^{M'-1}$ (S1406). The relation between $\{s_i\}_{i=0}^{M'-1}$ and the resource set according to the methods 1-1/1-2/2 is illustrated in FIG. 14 under the assumption that two RBG clusters are allocated. The uplink signal includes uplink-shared channel (UL-SCH) data and/or control information. Finally, the user equipment performs uplink transmission by using the resource set allocated from the network node (for example, base station or relay) (S1408). The uplink transmission may be performed through an uplink shared channel (for example, PUSCH).

FIG. 15 illustrates an example of resource allocation information according to the embodiment of the present invention. In this example, it is assumed that the number of RBGs is 9 and two resource sets (for example, RBG clusters) are allocated. Each of the resource sets is configured by continuous resources (for example, RBG).

Referring to FIG. 15, if a combinatorial index r within the resource allocation information indicates 117, since r=70+35+10+2=117, $\{s_0, s_1, s_2, s_3\} = \{2,3,5,8\}_{RBG}$ is obtained. According to the aforementioned method 1-1, since $\{S_m, E_m\} = \{s_{2m-2}, s_{2m-1}-1\}$, $\{S_1, E_1\} = \{s_0, s_1-1\} = \{2,2\}_{RBG}$ and $\{S_2, E_2\} = \{s_2, s_3-1\} = \{5,7\}_{RBG}$ are obtained. Accordingly, RBG #2 and RBG #5~7 are used to transmit the uplink signal.

Although not illustrated, if the method 1-2 and the method 2 are used, the methods are used as follows to transmit the uplink signal.

Method 1-2: $\{S_m, E_m\} = \{s_{2m-2}+1, s_{2m-1}\} \Rightarrow \{S_1, E_1\} = \{s_0+1, s_1\} = \{3,3\}_{RBG} \{S_2, E_2\} = \{s_2+1, s_3\} = \{6,8\}_{RBG}$
=>RBG #3 and RBG #6~8 are used to transmit the uplink signal.

Method 2: $\{SB_m, EB_m\}=\{s_{2m-2}, s_{2m-1}\}=>\{S_m, E_m\}=\{s_{2m-2}+1, s_{2m-1}\}=>\{S_1, E_1\}=\{s_0+1, s_1\}=\{3,3\}_{RBG}\{S_2, E_2\}=\{s_2+1, s_3\}=\{6,8\}_{RBG}$ =>RBG #3 and RBG #6-8 are used to transmit the uplink signal.

The aforementioned description has been made based on discontinuous uplink resource allocation. The LTE-A system may support both continuous uplink resource allocation and discontinuous uplink resource allocation. These two resource allocation methods may be signaled through the same DCI format. In this case, a resource allocation type, which is actually used, may be identified using a flag bit. For example, in the same manner as the DL RA type 0/1, a flag of 1 bit is applied to RA header of the DCI format for PUSCH scheduling, and then continuous resource allocation and discontinuous resource allocation may be signaled selectively through the flag of 1 bit.

Figure 16:
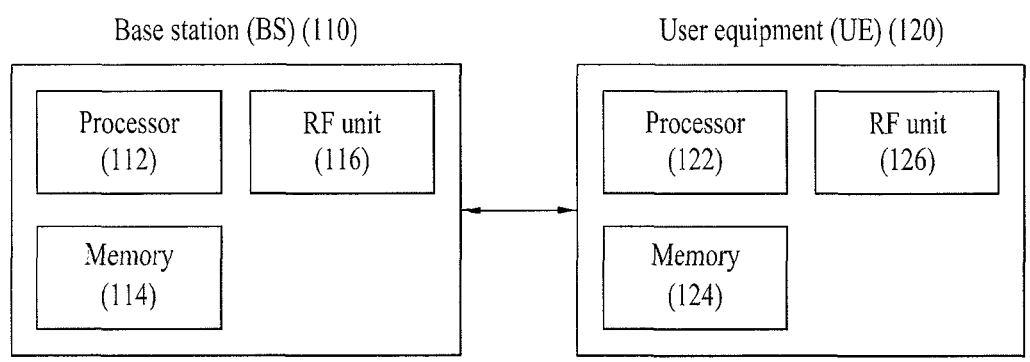
FIG. 16 is a diagram illustrating a base station and a user equipment, which can be applied to one embodiment of the present invention.

FIG. 16 is a diagram illustrating a base station and a user equipment, which may be applied to one embodiment of the present invention. The block diagram of the base station-user equipment may be replaced with a block diagram of base station-relay or relay-user equipment.

Referring to FIG. 16, a wireless communication system includes a base station (BS) 110 and a user equipment (UE) 120. The base station 110 includes a processor 112, a memory 114, and a radio frequency (RF) unit 116. The processor 112 may be configured to implement the procedures and/or the methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement the procedures and/or the methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be used for a wireless communication device such as a user equipment, a relay and a base station.

The invention claimed is:

1. A method for a communication apparatus to transmit an uplink signal in a wireless communication system, the method comprising:
   receiving, by the communication apparatus, a control channel signal including resource allocation information for two or more non-consecutive resource block sets, each resource block set of the two or more non-consecutive resource block sets including a single resource block group (RBG) or at least two consecutive RBGs;
   generating, by the communication apparatus, the uplink signal by mapping data to the two or more non-consecutive resource block sets; and
   transmitting, by the communication apparatus, the generated uplink signal in accordance with the resource allocation information for data transmission,
   wherein the resource allocation information uses a combinatorial index corresponding to at least four RBG indices: $s_0$, $s_1$, $s_2$ and $s_3$ to indicate the two or more non-consecutive resource block sets,
   wherein $s_0$ and $s_1-1$ indicate a starting RBG and an ending RBG, respectively, of a first resource block set of the two or more non-consecutive resource block sets, and
   wherein $s_2$ and $s_3-1$ indicate a starting RBG and an ending RBG, respectively, of a second resource block set of the two or more non-consecutive resource block sets.

2. The method of claim 1, wherein the control channel signal is a physical downlink control channel (PDCCH) signal, and the uplink signal is a physical uplink shared channel (PUSCH) signal.

3. The method of claim 1, wherein the combinatorial index is an index r per the following Equation:

$$r = \sum_{i=0}^{M'-1} \binom{N - s_i}{M' - i},$$

$$\binom{x}{y} = \begin{cases} \binom{x}{y} & \text{if } x \geq y \\ 0 & \text{if } x < y, \end{cases}$$

where, M' is 4, N is the number of RBGs+1, $\{s_i\}_{i=0}^{M'-1}$ satisfies $1 \leq s_i \leq N$ and $s_i < s_{i+1}$, and $$\binom{x}{y}$$

represents $$\frac{x(x-1) \ldots (x-y+1)}{y(y-1) \ldots 1}.$$

4. The method of claim 1, wherein the N is given by the following Equation:

$$\lceil N_{RB}^{UL}/P \rceil + 1$$

where $N_{RB}^{UL}$ represents the number of resource blocks of an uplink band, P represents the number of resource blocks constituting an RBG, and ⌈ ⌉ represents a ceiling function.

5. A communication apparatus configured for use in a wireless communication system, the communication apparatus comprising:
a radio frequency (RF) unit;
a memory; and
a processor coupled to the RF unit and the memory, the processor is configured to:
receive a control channel signal including resource allocation information for two or more non-consecutive resource block sets, each resource block set of the two or more non-consecutive resource block sets including a single resource block group (RBG) or at least two consecutive RBGs, and
generate an uplink signal by mapping data to the two or more non-consecutive resource block sets, and
transmit the generated uplink signal in accordance with the resource allocation information for data transmission,
wherein the resource allocation information uses a combinatorial index corresponding to at least four RBG indices: $s_0$, $s_1$, $s_2$ and $s_3$ to indicate the two or more non-consecutive resource block sets,
wherein $s_0$ and $s_1-1$ indicate a starting RBG and an ending RBG, respectively, of a first resource block set of the two or more non-consecutive resource block sets, and
wherein $s_2$ and $s_3-1$ indicate a starting RBG and an ending RBG, respectively, of a second resource block set of the two or more non-consecutive resource block sets.

6. The communication apparatus of claim 5, wherein the control channel signal is a physical downlink control channel (PDCCH) signal, and the uplink signal is a physical uplink shared channel (PUSCH) signal.

7. The communication apparatus of claim 5, wherein the combinatorial index is an index r per the following Equation:

$$r = \sum_{i=0}^{M'-1} \binom{N - s_i}{M' - i},$$

$$\binom{x}{y} = \begin{cases} \binom{x}{y} & \text{if } x \geq y \\ 0 & \text{if } x < y, \end{cases}$$

where, M' is 4, N is the number of RBGs+1, $\{s_i\}_{i=0}^{M'-1}$ satisfies $1 \leq s_i \leq N$ and $s_i < s_{i+1}$, and $$\binom{x}{y}$$

represents $$\frac{x(x-1) \ldots (x-y+1)}{y(y-1) \ldots 1}.$$

8. The communication apparatus of claim 5, wherein the N is given by the following Equation:

$$\lceil N_{RB}^{UL}/P \rceil + 1$$

where $N_{RB}^{UL}$ represents the number of resource blocks of an uplink band, P represents the number of resource blocks constituting an RBG, and ⌈ ⌉ represents a ceiling function.

9. A method for a communication apparatus to receive an uplink signal in a wireless communication system, the method comprising:
transmitting, by the communication apparatus, a control channel signal including resource allocation information for two or more non-consecutive resource block sets, each resource block set of the two or more non-consecutive resource block sets including a single resource block group (RBG) or at least two consecutive RBGs;
receiving, by the communication apparatus, the uplink signal in accordance with the resource allocation information for data reception; and
processing, by the communication apparatus, the received uplink signal by de-mapping data from the two or more non-consecutive resource block sets,
wherein the resource allocation information uses a combinatorial index corresponding to at least four RBG indices: $s_0$, $s_1$, $s_2$ and $s_3$ to indicate the two or more non-consecutive resource block sets,
wherein $s_0$ and $s_1-1$ indicate a starting RBG and an ending RBG, respectively, of a first resource block set of the two or more non-consecutive resource block sets, and
wherein $s_2$ and $s_3-1$ indicate a starting RBG and an ending RBG, respectively, of a second resource block set of the two or more non-consecutive resource block sets.

10. The method of claim 9, wherein the control channel signal is a physical downlink control channel (PDCCH) signal, and the uplink signal is a physical uplink shared channel (PUSCH) signal.

11. The method of claim 9, wherein the combinatorial index is an index r per the following Equation:

$$r = \sum_{i=0}^{M'-1} \binom{N-s_i}{M'-i},$$

$$\binom{x}{y} = \begin{cases} \binom{x}{y} & \text{if } x \geq y \\ 0 & \text{if } x < y, \end{cases}$$

where, M' is 4, N is the number of RBGs+1, $\{s_i\}_{i=0}^{M'-1}$ satisfies $1 \leq s_i \leq N$ and $s_i < s_{i+1}$, and $$\binom{x}{y}$$

represents $$\frac{x(x-1) \ldots (x-y+1)}{y(y-1) \ldots 1}.$$

12. The method of claim 9, wherein the N is given by the following Equation:

$$\lceil N_{RB}^{UL}/P \rceil + 1$$

where $N_{RB}^{UL}$ represents the number of resource blocks of an uplink band, P represents the number of resource blocks constituting an RBG, and $\lceil \ \rceil$ represents a ceiling function.

13. A communication apparatus configured for use in a wireless communication system, the communication apparatus comprising:
a radio frequency (RF) unit;
a memory; and
a processor coupled to the RF unit and the memory, the processor is configured to:
transmit a control channel signal including resource allocation information for two or more non-consecutive resource block sets, each resource block set of the two or more non-consecutive resource block sets including a single resource block group (RBG) or at least two consecutive RBGs,
receive an uplink signal in accordance with the resource allocation information for data reception, and
process the received uplink signal by de-mapping data from the two or more non-consecutive resource block sets,
wherein the resource allocation information uses a combinatorial index corresponding to at least four RBG indices: $s_0$, $s_1$, $s_2$ and $s_3$ to indicate the two or more non-consecutive resource block sets,
wherein $s_0$ and $s_1-1$ indicate a starting RBG and an ending RBG, respectively, of a first resource block set of the two or more non-consecutive resource block sets, and
wherein $s_2$ and $s_3-1$ indicate a starting RBG and an ending RBG, respectively, of a second resource block set of the two or more non-consecutive resource block sets.

14. The communication apparatus of claim 13, wherein the control channel signal is a physical downlink control channel (PDCCH) signal, and the uplink signal is a physical uplink shared channel (PUSCH) signal.

15. The communication apparatus of claim 13, wherein the combinatorial index is an index r per the following Equation:

$$r = \sum_{i=0}^{M'-1} \binom{N-s_i}{M'-i},$$

$$\binom{x}{y} = \begin{cases} \binom{x}{y} & \text{if } x \geq y \\ 0 & \text{if } x < y, \end{cases}$$

where, M' is 4, N is the number of RBGs+1, $\{s_i\}_{i=0}^{M'-1}$ satisfies $1 \leq s_i \leq N$ and $s_i < s_{+1}$, and $$\binom{x}{y}$$

represents $$\frac{x(x-1) \ldots (x-y+1)}{y(y-1) \ldots 1}.$$

16. The communication apparatus of claim 13, wherein the N is given by the following Equation:

$$\lceil N_{RB}^{UL}/P \rceil + 1$$

where $N_{RB}^{UL}$ represents the number of resource blocks of an uplink band, P represents the number of resource blocks constituting an RBG, and $\lceil \ \rceil$ represents a ceiling function.

* * * * *